United States Patent
Krishnan et al.

(10) Patent No.: US 12,299,015 B2
(45) Date of Patent: May 13, 2025

(54) GENERATIVE SUMMARIZATION DIALOG-BASED INFORMATION RETRIEVAL SYSTEM

(71) Applicant: Microsoft Technology Licensing, LLC, Redmond, WA (US)

(72) Inventors: Aparna Krishnan, San Jose, CA (US); Christopher Wright Lloyd, II, Brooklyn, NY (US); Jeremy K. Owen, Mountain View, CA (US); Christopher J. Fong, San Mateo, CA (US); Suman Sundaresh, Los Altos, CA (US); Lavish Shah, New York, NY (US); Muhammad Basit Khurram, Bellevue, WA (US); Michaela Jillings, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/216,553

(22) Filed: Jun. 29, 2023

(65) Prior Publication Data

US 2025/0005050 A1   Jan. 2, 2025

(51) Int. Cl.
*G06F 17/30* (2006.01)
*G06F 16/3329* (2025.01)
(Continued)

(52) U.S. Cl.
CPC ........ *G06F 16/3329* (2019.01); *G06F 16/334* (2019.01); *G06F 16/338* (2019.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS

| | | | |
|---|---|---|---|
| 9,607,046 B2 * | 3/2017 | Hakkani-Tur | G06Q 10/02 |
| 2004/0073431 A1 * | 4/2004 | Galanes | G06F 9/451 |
| | | | 704/270.1 |

(Continued)

OTHER PUBLICATIONS

U.S. Appl. No. 18/759,036, filed Jun. 28, 2024.
(Continued)

*Primary Examiner* — Hung D Le
(74) *Attorney, Agent, or Firm* — Nicholson De Vos Webster & Elliott LLP

(57) ABSTRACT

Embodiments of the disclosed technologies include generating a search prompt based on an input portion of an online dialog involving a user of a computing device. The search prompt includes a dialog summarization instruction configured to instruct a generative artificial intelligence model to generate and output a dialog summary. The search prompt is sent to a first generative model. In response to the search prompt, a search query is generated and output by the first generative model based on the dialog summary. The search query is sent to a search system. Search result data is determined based on an execution of the search query by the search system. At least some of the search result data is included in an output portion of the online dialog. The output portion is configured to be displayed at the computing device in response to the input portion of the online dialog.

19 Claims, 17 Drawing Sheets

(51) Int. Cl.
*G06F 16/334* (2025.01)
*G06F 16/338* (2019.01)

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | | |
|---|---|---|---|---|
| 2005/0091059 A1* | 4/2005 | Lecoeuche | ........ | H04M 1/72445 704/270.1 |
| 2005/0154591 A1* | 7/2005 | Lecoeuche | ............. | G10L 15/30 704/E15.047 |
| 2005/0203747 A1* | 9/2005 | Lecoeuche | ............. | G06F 16/36 704/270.1 |
| 2007/0005369 A1* | 1/2007 | Potter | .................. | G10L 15/063 704/E15.04 |
| 2015/0142420 A1* | 5/2015 | Sarikaya | ............. | G10L 15/1815 704/9 |
| 2016/0179908 A1* | 6/2016 | Johnston | ............. | G06F 3/04847 707/724 |
| 2018/0052885 A1* | 2/2018 | Gaskill | ..................... | G06N 5/04 |
| 2018/0052913 A1* | 2/2018 | Gaskill | ..................... | G06N 5/04 |
| 2018/0108066 A1* | 4/2018 | Kale | ................. | G06F 16/24522 |
| 2018/0261223 A1* | 9/2018 | Jain | .................... | G06Q 30/0601 |
| 2018/0329998 A1* | 11/2018 | Thomson | .......... | H04N 21/42203 |
| 2020/0007474 A1* | 1/2020 | Zhang | ..................... | G09B 7/02 |
| 2020/0126550 A1* | 4/2020 | Kim | ........................ | G16H 10/60 |
| 2020/0193331 A1* | 6/2020 | Larson | .................... | G06N 20/20 |
| 2023/0028693 A1* | 1/2023 | Marzinzik | ............... | H04L 51/52 |
| 2023/0153348 A1* | 5/2023 | Li | .......................... | G06N 20/00 707/769 |
| 2024/0070403 A1* | 2/2024 | Meng | ...................... | G06F 40/51 |
| 2024/0104336 A1* | 3/2024 | Irving | .................... | G06N 3/092 |

OTHER PUBLICATIONS

International Search Report and Written Opinion received for PCT Application No. PCT/US2024/034883, Sep. 30, 2024, 15 pages.

Mo, et al., "ConvGQR: Generative Query Reformulation for Conversational Search", arxiv.org, Cornell University Library, 201 Olin Library Cornell University Ithaca, NY, May 25, 2023, 13 pages.

Spataro, Jared., "Introducing Microsoft 365 Copilot—your Copilot for Work—The Official Microsoft Blog", Retrieved from URL: https://blogs.microsoft.com/blog/2023/03/16/introducing-microsoft-365-copilot-your-copilot-for-work/, Mar. 16, 2023, 07 Pages.

Xinbei, Ma, et al., "Query Rewriting for Retrieval-Augmented Large Language Models", arxiv.org, Cornell University Library, 201 Olin Library Cornell University Ithaca, NY, May 23, 2023, 8 pages.

* cited by examiner

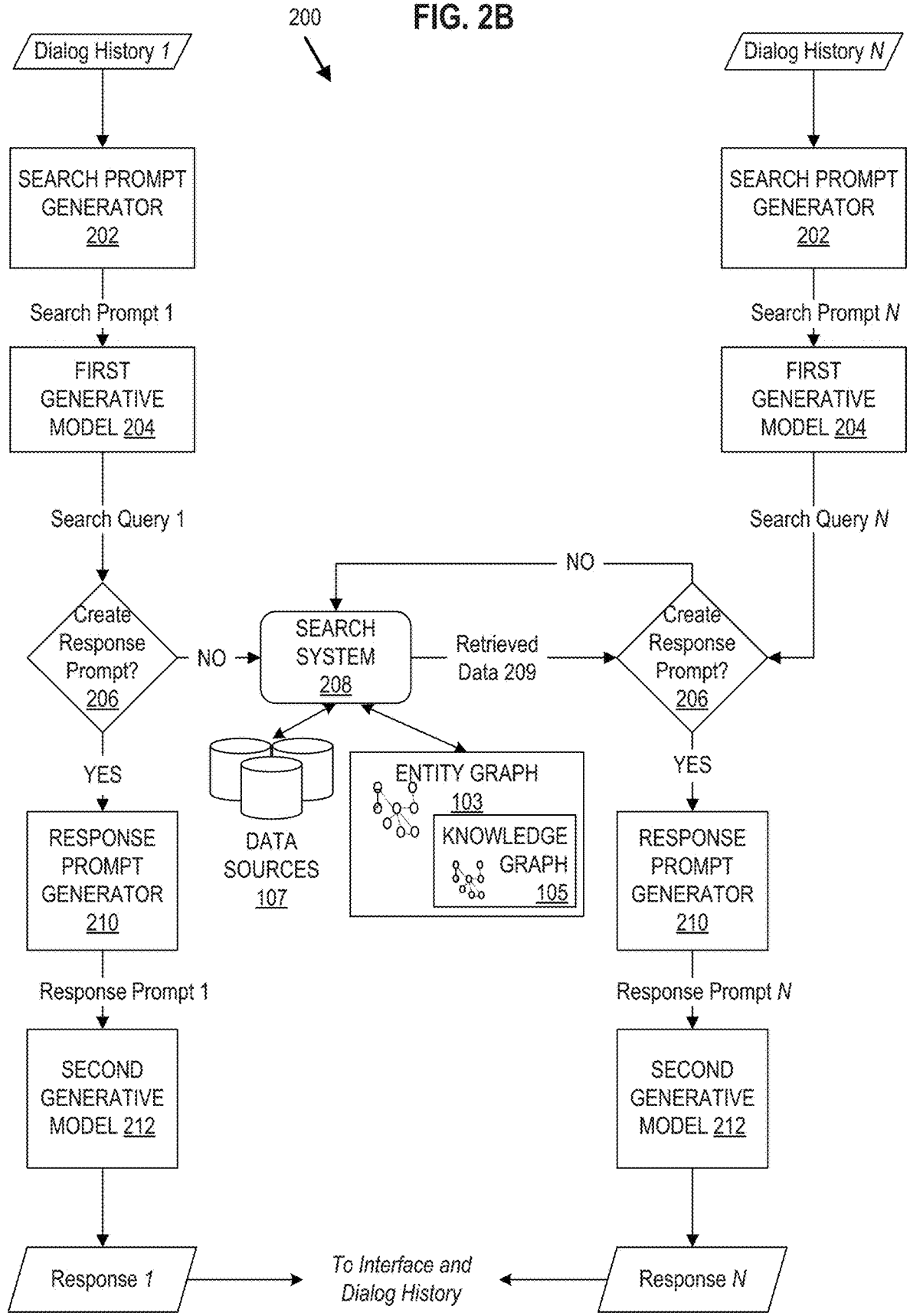

🔍 FirstName1 LastName1 • now

My team is under a lot of pressure and getting burnt out. How can I reduce some of the pressure on them while still holding them accountable for our commitments?

Here are some suggestions to help with your teams workload while holding them accountable to their commitments:

- In the course CourseTitle1, instructor FirstName2 LastName2 talks about the importance of creating sustainable goals. You can consider helping your team to set smaller goals and work towards them systematically to preserve energy and progress sustainably.
- FirstName3 LastName3 teaches that the foundation of accountability is creating trust and discussing a recommitment that reestablishes trust in his course FirstName3 LastName3 on ArticleTitle1.
- Find more tips in the CourseTitle2 Learning Path from your company I hope this helps. Let me know if you'd like more information from these experts?

Instructors mentioned ( 🔍 FirstName2 LastName2 )   ( 🔍 FirstName3 LastName3 )   354

( 🔍 FirstName4 LastName4 )

I'd like to go deeper with FirstName3. Does he have any advice on how to hold my team accountable but not stress them out by making them feel micromanaged?   356

( Send )   352

Please note that while I am an expert on professional topics such as Leadership, Management and Career Development, as an AI powered bot I am still learning and may get things wrong

FIG. 3C

Here are some suggestions to help with your teams workload while holding them accountable to their commitments:

- In the course CourseTitle1, instructor FirstName2 LastName2 talks about the importance of creating sustainable goals. You can consider helping your team to set smaller goals and work towards them systematically to preserve energy and progress sustainably.
- FirstName3 LastName3 teaches that the foundation of accountability is creating trust and discussing a recommitment that reestablishes trust in his course FirstName3 LastName3 on ArticleTitle1
- Find more tips in the CourseTitle2 Learning Path from your company I hope this helps. Let me know if you'd like more information from these experts?
Instructors mentioned @ FirstName2 LastName2    @ FirstName3 LastName3    @ FirstName4 LastName4

@ FirstName1 LastName1 • now

352 — I'd like to go deeper with FirstName3. Does he have any advice on how to hold my team accountable but not stress them out by making them feel micromanaged?

360 — Yes, FirstName3 recommends making sure the commitment you are asking for is crystal clear. You can consider establishing clear commitments upfront including the goal, deliverable, specific date, and update cadence in order to not come across as a micromanager. Is that helpful to you?

It is, but I have oner person on my team who has a lot going on in their personal life that gets in the way of their commitments. I want to be supportive, but also need to hold them accountable to at least provide me with updates on impact to their deliverables. How should I go about this?  — 364

Send

Please note that while I am an expert on professional topics such a as Leadership, Management and Career Development, as an AI powered bot I am still learning and may get things wrong

FirstName1 LastName1 • now

352 — I'd like to go deeper with FirstName3. Does he have any advice on how to hold my team accountable but not stress them out by making them feel micromanaged?

360 — Yes, FirstName1 recommends making sure the commitment you are asking for is crystal clear. You can consider establishing clear commitments upfront including the goal, deliverable, specific date, and update cadence in order to not come across as a micromanager. Is that helpful to you?

FirstName1 LastName1 • now

364 — It is, but I have one person on my team who has a lot going on in their personal life that gets in the way of their commitments. I want to be supportive, but also need to hold them accountable to at least provide me with updates on their deliverables. How should I go about this?

366 — I didn't find anything from FirstName1 on that specific topic, but you can submit a question to him directly for for review. It also looks like he has office hours upcoming on May 5.

368 — Submit question    Sign up for Office Hours — 370

372 — In case it's helpful, FirstName5 LastName5 recommends three ways to support a struggling employee in her course CourseTitle3:
- Be fully present and actively listen to employees
- Minimize uncertainty and ambiguity
- Role model practices that reduce stress — 378

Instructors and content mentioned

374 — FirstName5 LastName5   +   CourseTitle3
       JobTitle2

376

Send a message...    Send

Please note that while I am an expert on professional topics such as Leadership, Management and Career Development, as an AI powered bot I am still learning and may get things wrong

```
┌─────────────────────────────────────────────────────────────────────┐
│ Generate a first search prompt based on a first input portion of an │
│ online dialog involving a user of a computing device, where the     │
│ first search prompt includes a dialog summarization instruction.    │
│                              702                                    │
└─────────────────────────────────────────────────────────────────────┘
                                  ↓
┌─────────────────────────────────────────────────────────────────────┐
│         Send the first search prompt to a first large language model.│
│                              704                                    │
└─────────────────────────────────────────────────────────────────────┘
                                  ↓
┌─────────────────────────────────────────────────────────────────────┐
│ Receive a first search query generated and output by the first      │
│ large language model based on a dialog summary.                     │
│                              706                                    │
└─────────────────────────────────────────────────────────────────────┘
                                  ↓
┌─────────────────────────────────────────────────────────────────────┐
│              Send the first search query to a search system.        │
│                              708                                    │
└─────────────────────────────────────────────────────────────────────┘
                                  ↓
┌─────────────────────────────────────────────────────────────────────┐
│ Receive search result data determined based on an execution of the  │
│ first search query by the search system.                            │
│                              710                                    │
└─────────────────────────────────────────────────────────────────────┘
                                  ↓
┌─────────────────────────────────────────────────────────────────────┐
│ Include at least some of the search result data in a first output   │
│ portion of the online dialog.                                       │
│                              712                                    │
└─────────────────────────────────────────────────────────────────────┘
```

GENERATIVE SUMMARIZATION DIALOG-BASED INFORMATION RETRIEVAL SYSTEM

TECHNICAL FIELD

A technical field to which the present disclosure relates includes computer programs that use artificial intelligence to understand user queries and automate responses to those queries in a manner that simulates human conversation. Another technical field to which the present disclosure relates is generative artificial intelligence.

COPYRIGHT NOTICE

This patent document, including the accompanying drawings, contains material that is subject to copyright protection. The copyright owner has no objection to the facsimile reproduction of this patent document, as it appears in the publicly accessible records of the United States Patent and Trademark Office, consistent with the fair use principles of the United States copyright laws, but otherwise reserves all copyright rights whatsoever.

BACKGROUND

A search engine is a software system that is designed to find and retrieve stored information that matches a search query. A chatbot (or chat bot) is a software application that can retrieve information and answer questions by simulating a natural language conversation with a human user. A recommendation system is a software system that automatically generates proactive recommendations for a user without explicitly receiving a query from the user.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

FIG. 2B is a flow diagram showing an example of communications among a search system and a generative summarization dialog-based information retrieval system in accordance with some embodiments of the present disclosure.

FIG. 3A, FIG. 3B, FIG. 3C, FIG. 3D, and FIG. 3E illustrate an example of at least one flow including screen captures of user interface screens configured to provide generative summarization dialog-based information retrieval in accordance with some embodiments of the present disclosure.

FIG. 4A, FIG. 4B, and FIG. 4C illustrate an example of at least one flow including screen captures of user interface screens configured to provide generative summarization dialog-based information retrieval in accordance with some embodiments of the present disclosure.

FIG. 7 is a flow diagram of an example method for generative summarization dialog-based information retrieval using components of a generative summarization dialog-based information retrieval system in accordance with some embodiments of the present disclosure.

DETAILED DESCRIPTION

Figure 1A:
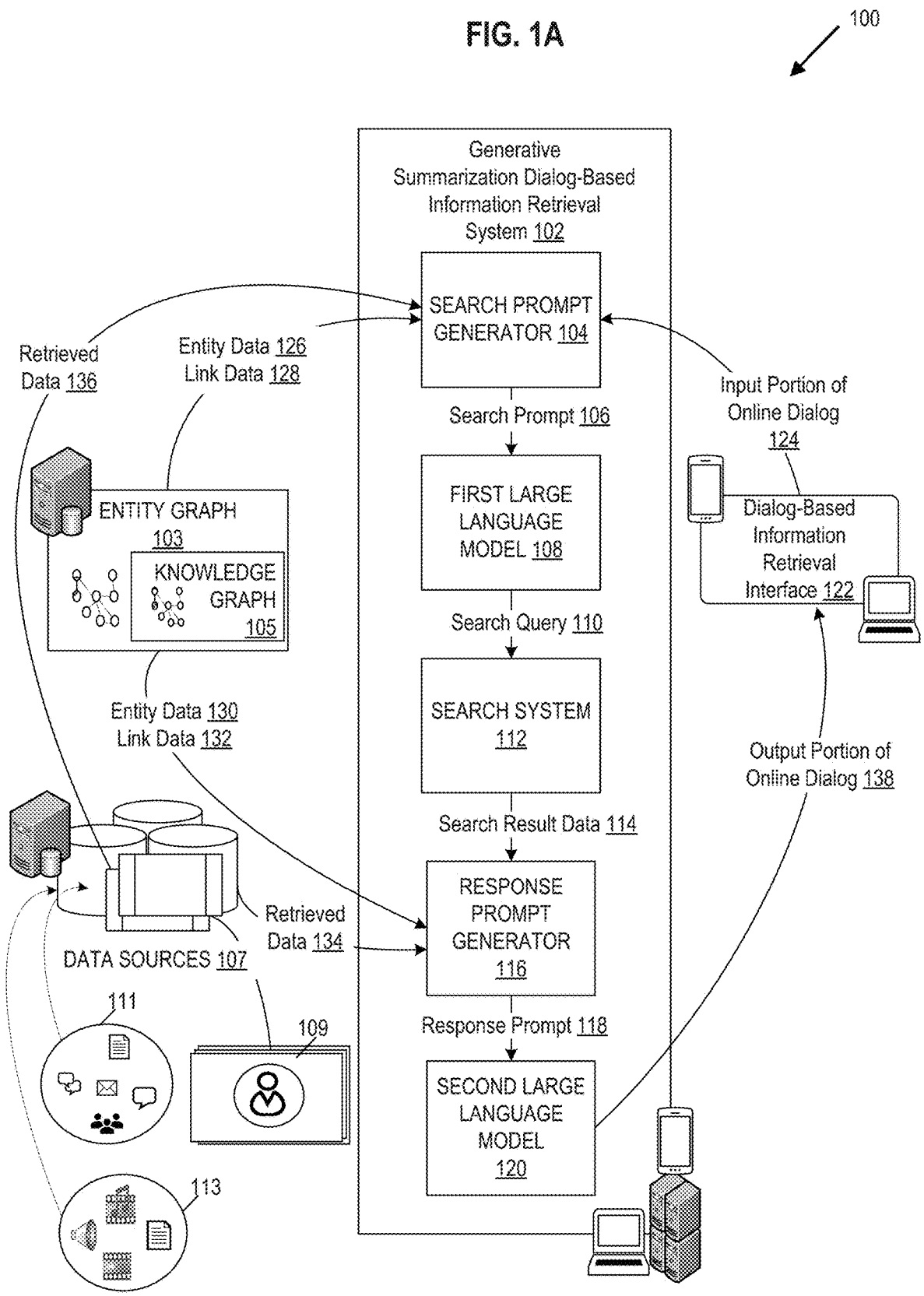
FIG. 1A is a flow diagram of an example method for generative summarization dialog-based information retrieval using components of a generative summarization dialog-based information retrieval system in accordance with some embodiments of the present disclosure.

People often turn to their computing devices when they need an answer to a question or would like to learn about a particular topic. For example, new issues frequently arise in the workplace, in the course of one's career development, or in one's personal life, and people look to online resources for help researching, understanding, and learning about these issues.

Conventional search engines require the user to explicitly provide or select search terms that identify the kind of information the user is looking for. While search engines are ubiquitous, it remains an ongoing challenge to design a search engine to accurately interpret user queries on an individualized basis because every user has a unique communication style and expresses themselves differently in different circumstances. Using a search engine, the user often needs to reword or rephrase their query multiple different times in a trial-and-error process in order to ultimately obtain a desirable set of search results.

Conventional chatbots operate in a similar way as search engines, but in a manner that simulates a human conversation. Thus, the chatbot replaces multiple iterations on a search query with multiple rounds of conversational dialog with the human user.

Conventional search engines and chatbots work best when the user has a clear idea of the kind of information or assistance they are seeking, e.g., a well-defined objective, goal, or intent. For example, conventional search engines rely on developing a specific index of content that has been previously crawled and analyzed. As such, the effectiveness of the results of the search query are dependent upon the categorizations of the index structure and how well the index structure matches the parameters of the user's query. Conventionally, the most effective chatbots have been those that have been designed to handle inquiries of a specific type or narrowly-defined topic. For example, chatbots have been used to implement product-specific technical support, where the user can tell the chatbot exactly what is not working about a specific product about which the chatbot has been designed to answer questions.

However, conventional search engines and chatbots can be both wasteful of computing resources and frustrating, particularly for the user whose intent is less clear. Even after multiple rounds of searching or dialog with the chatbot, the user may still not have achieved their objective. With both conventional search engines and chatbots, if the user's request is imprecise, the system often returns too many search results or too much information.

In some scenarios, the type of assistance the user is seeking may lend itself to lengthy dialogs that conventional search engines and chatbots are not equipped to support. An example used to illustrate an application of the disclosed technologies is personalized skill development. Prior to the disclosed technologies, chat-style software has not been widely successfully implemented to assist users with the process of identifying and developing skills that are aligned with the users' specific career goals, objectives, preferences and capabilities.

Conventional recommendation systems use machine learning models to algorithmically predict likely helpful recommendations for users based on historical data and present those recommendations to users proactively, e.g., using push-style notifications. As such, conventional recommendation systems aren't responsive to current user inputs, especially if the current user inputs diverge in substance from the historical data.

A generative model uses artificial intelligence technology, e.g., neural networks, to machine-generate new digital content based on model inputs and the previously existing data with which the model has been trained. Whereas discriminative models are based on conditional probabilities $P(y|x)$, that is, the probability of an output y given an input x (e.g., is this a photo of a dog?), generative models capture joint probabilities $P(x, y)$, that is, the likelihood of x and y occurring together (e.g., given this photo of a dog and an unknown person, what is the likelihood that the person is the dog's owner, Sam?).

A generative language model is a particular type of generative model that machine-generates new text in response to model input, for example by iteratively predicting each subsequent word of a sentence. The model input includes a task description, also referred to as a prompt. The task description can include instructions and/or examples of digital content. A task description can be in the form of natural language text, such as a question or a statement, and can include non-text forms of content, such as digital imagery and/or digital audio.

Given a task description, a generative model can generate a set of task description-output pairs, where each pair contains a different output. In some implementations, the generative model assigns a score to each of the generated task description-output pairs. The output in a given task description-output pair contains text that is generated by the model itself rather than provided to the model as an input. The score associated by the model with a given task description-output pair represents a probabilistic or statistical likelihood of there being a relationship between the output and the corresponding task description in the task description-output pair. The score for a given task description-output pair is dependent upon the way the generative model has been trained and the data used to perform the model training. The generative model can sort the task description-output pairs by score and output only the pair or pairs with the top scores. For example, the generative model could discard the lower-scoring pairs and only output the top-scoring pair as its final output.

A large language model (LLM) is a type of generative language model that is trained in an unsupervised way on massive amounts of unlabeled data, such as publicly available texts extracted from the Internet, using deep learning techniques. A large language model can be configured to perform one or more natural language processing (NLP) tasks, such as generating text, classifying text, answering questions in a conversational manner, and translating text from one language to another.

Large language models are artificial intelligence (AI) technologies that are capable of answering questions in a conversational manner. Due to having been trained on extensive amounts of data, large language models are also capable of operating online dialogs over a wide range of topics. Thus, large language models have the potential to improve the performance of chatbots.

However, large language models have the technical problem of hallucination. In artificial intelligence, a hallucination is often defined as generated content that is nonsensical or unfaithful to the provided source content. Because chatbots can involve lengthy dialogs or ambiguous inputs, the risk of AI hallucination is increased. For example, the risk of AI hallucination may increase when the user switches among multiple different topics within the same dialog session, returns to a topic of an earlier thread, or inputs an ambiguous request, such as "how can I get promoted?" As a result, AI hallucination is a barrier to the use of LLMs in chatbots.

Another technical challenge to the use of LLMs in chatbots is prompt engineering. Prompt engineering as used herein may refer to a process of constructing a prompt for input to a generative model, such as a large language model, to optimize the likelihood that the generative model will generate a desired output in response to the prompt. Often, a more detailed prompt achieves better generative model output than a less detailed prompt. However, more detailed prompts are traditionally lengthier or contain more parameters than less detailed prompts. Since many generative models have limitations on the size of the prompt, in terms of string length, number of parameters, etc., the goal of optimizing the generative model output may conflict with the structural limitations of the generative model.

As a result of these and other issues, a technical challenge is to incorporate generative models, such as LLMs, into a chatbot-style information retrieval system while mitigating the risk of AI hallucination with resource-efficient prompt engineering.

Another technical challenge is how to generate images, videos, and/or audio and include machine-generated images, videos, and/or audio in a response to a user request. Still another technical challenge is reducing the burden of user input when responding to user requests and when determining what information to retrieve in response to user requests. Yet another technical challenge is to scale an information retrieval system to serve a large number of users and user requests without having to increase the size of the information retrieval system linearly. An additional technical challenge is efficient information retrieval; for example, adapting system-generated responses to user requests according to varying configurations of user devices, such as different screen sizes, device types, etc. A further technical challenge is dealing with latency in information retrieval; for example, how to configure the information retrieval system to detect and respond when latency is increasing.

To address these and other technical challenges of conventional information retrieval systems, the disclosed technologies provide a generative summarization dialog-based information retrieval system. The disclosed technologies are generative in that one or more generative models (e.g., LLMs) are used to machine-generate and output responses to user requests in a conversational natural language manner. The disclosed technologies utilize the generative summarization capabilities of generative models to improve prompt engineering and reduce the likelihood of AI hallucination.

For example, the disclosed technologies configure the summarization capabilities of LLMs to generate concise prompts that can constrain the operation of one or more LLMs to well-defined sets of input parameters so as to avoid AI hallucination. For instance, if a user request asks, "how can I get promoted?" then in conventional approaches without the disclosed technologies, AI hallucination may occur because the LLM may not have the context to determine, for example, the user's current job, current skills, or career goals. However, the disclosed technologies can automatically engineer a concise, disambiguated prompt before the prompt is submitted to the LLM, to avoid AI hallucination while achieving operational efficiencies.

As another example, the disclosed technologies configure the summarization capabilities of LLMs to, even when the user's input is imprecise, generate concise responses that conserve computing resources and avoid overwhelming the user with too many search results or too much information.

As described in more detail below, the disclosed technologies include a search prompt generator and a response prompt generator. The search prompt generator generates a search prompt, which includes instructions configured to cause a generative model to machine-generate and output a search query that can be executed by a search system. The response prompt generator generates a response prompt, which includes instructions configured to cause a generative model to machine-generate and output a response, which potentially includes search result data retrieved by the search system, and which can be presented to a user in a dialog format. Embodiments of either or both of the search prompt and the response prompt are configured using generative summarization capabilities.

In some implementations, the disclosed technologies leverage one or more contextual resources, such as dialog history, entity graphs, graph-based networks, recommendation systems, domain applications, and/or external data sources, to identify one or more parameters to be used to constrain the operations of the one or more LLMs. For instance, embodiments of the disclosed technologies use one or more contextual resources to formulate, disambiguate, expand, or interpret a search query and/or to curate a set of search results before the search results are presented to the user. For example, if a user inputs a question such as "how do I get promoted," embodiments can generate a summary of the user's dialog history and/or one or more other contextual resources, and use the summary to disambiguate the user's question and generate a concise search query.

As another example, if a user inputs a request such as "help me understand AI," embodiments can generate a summary of one or more contextual resources and use the summary to determine the user's current level of understanding (e.g., based on previous online activity), skill level (e.g., based on attributes of the user's online profile), and current job position (e.g., technical or managerial), and filter or expand a set of search results accordingly. For instance, embodiments can use information about the user's current skills or level of understanding to filter out or down rank beginner-level training materials and include or up rank advanced-level materials in the system-generated response. As another example, embodiments can curate a search result set based on the user's current job position. For instance, if the user's current job title is software engineer, learning resources that discuss AI from a technical, engineering perspective may be up ranked and presented to the user, while other resources that talk about AI from a business perspective may be down ranked and not presented to the user.

Skill development is one example of information retrieval that can be enhanced using the disclosed technologies. For example, the disclosed technologies can be configured as a skill development coach software program that can help users identify online learning resources. Other example use cases include academic education, training, learning, healthcare, wellness, e-commerce, and other domain-specific applications as well as more generalized or domain-independent information retrieval environments.

Certain aspects of the disclosed technologies are described in the context of generative models, such as large language models, that output pieces of writing, i.e., natural language text. However, the disclosed technologies are not limited to generative models that produce text output. For example, aspects of the disclosed technologies can be used to generate output that includes non-text forms of machine-generated output, such as digital imagery, videos, multimedia, audio, hyperlinks, and/or platform-independent file formats.

Certain aspects of the disclosed technologies are described in the context of electronic dialogs conducted via a network, user connection network, or application software system, such as an instant messaging service, a chatbot, or a social network service. However, aspects of the disclosed technologies are not limited to such contexts, but can be used to improve information retrieval with other types of software applications. Any network-based application software system can act as an application software system to which the disclosed technologies can be applied. For example, news, entertainment, and e-commerce apps installed on mobile devices, enterprise systems, messaging systems, search engines, workflow management systems, collaboration tools, and social graph-based applications can all function as application software systems with which the disclosed technologies can be used.

The disclosure will be understood more fully from the detailed description given below, which references the accompanying drawings. The detailed description of the drawings is for explanation and understanding, and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains, but can be used with or incorporated into other embodiments, including embodiments shown in other drawings.

As used herein, dialog or conversation may refer to one or more digital threads involving a user of a computing device and an information retrieval system. For example, a dialog or conversation can have an associated user identifier, session identifier, conversation or dialog identifier and timestamp. Thread as used here may refer to one or more rounds of dialog involving the user and the information retrieval system. A round of dialog as used herein may refer to a user input and an associated system-generated response, e.g., a system-generated reply to the user input. For example, a thread can include an input portion of a dialog, such as a question received from a user of a computing device, and an output portion of the dialog, such as a natural language response machine-generated by the information retrieval system in response to the user's question.

Any dialog or dialog portion can include one or more different types of digital content, including natural language text, audio, video, digital imagery, hyperlinks, and/or multimodal content such as web pages. A dialog portion can have an associated source identifier (e.g., user or system) identifying the source of the dialog portion, and a timestamp.

FIG. 1A is a flow diagram of an example method for generative summarization dialog-based information retrieval using components of a generative summarization dialog-based information retrieval system in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of generative summarization dialog-based information retrieval system 102, including, in some embodiments, components shown in FIG. 1A that may not be specifically shown in FIG. 5, or by components of generative summarization dialog-based information retrieval system 580 of FIG. 5, including, in some embodiments, components shown in FIG. 5 that may not be specifically shown in FIG. 1A, or by components shown in any of the figures that may not be specifically shown in FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 1A, an example computing system 100 is shown, which includes an example generative summarization dialog-based information retrieval system 102 and an example dialog-based information retrieval interface 122. The generative summarization dialog-based information retrieval system 102 of FIG. 1A includes a search prompt generator 104, a first large language model 108, a search system 112, a response prompt generator 116, and a second large language model 120, as described in more detail below.

In the example of FIG. 1A, the components of the generative summarization dialog-based information retrieval system 102 are implemented using an application server or server cluster, which can include a secure environment (e.g., secure enclave, encryption system, etc.) for the processing of online dialogs. In other implementations, one or more components of the generative summarization dialog-based information retrieval system 102 are implemented on a client device, such as a user system 510, described herein with reference to FIG. 5. The generative summarization dialog-based information retrieval system 102 is in bidirectional communication with dialog-based information retrieval interface 122 via a computer network. Dialog-based information retrieval interface 122 includes front end user interface functionality that, in some embodiments, is considered part of generative summarization dialog-based information retrieval system 102.

As indicated in FIG. 1A, components of computing system 100 are distributed across multiple different computing devices, e.g., one or more client devices, application servers, web servers, and/or database servers, connected via a network, in some implementations. In other implementations, at least some of the components of computing system 100 are implemented on a single computing device such as a client device. For example, some or all of generative summarization dialog-based information retrieval system 102 is implemented directly on the user's client device in some implementations, thereby avoiding the need to communicate with servers over a network such as the Internet.

As described in more detail below, search prompt generator 104 and response prompt generator 116 are each configured to formulate and output specific types of prompts that can be used as inputs to one or more generative models, such as large language models. Prompt as used herein includes, for example, one or more machine-readable questions, statements, instructions, and/or examples in combination with one or more inputs including a set of parameter values that constrain the operations of the generative model, e.g., large language model, in generating and outputting a response to the prompt.

The way in which the elements of the prompt are organized and the phrasing used to articulate the prompt elements can significantly affect the output produced by the generative model, e.g., large language model, in response to the prompt. For example, a small change in the prompt content or structure can cause the generative model, e.g., large language model, to generate a very different output. As such, search prompt generator 104 and response prompt generator 116 are each specially configured to generate prompts to cause one or more generative models, e.g., large language models, to generate output that are responsive to specific inputs in accordance with specific parameters, instructions, and constraints that are applicable to a specific task to be performed by the one or more generative models, e.g., large language models, such as query generation or response generation.

To create and operate various portions of generative summarization dialog-based information retrieval system 102 and/or dialog-based information retrieval interface 122, components of the generative summarization dialog-based information retrieval system 102 and/or dialog-based information retrieval interface 122 can access one or more contextual resources to, for example, obtain parameter values that can be used to formulate prompts and/or constrain the operations of one or more large language models. Examples of contextual resources shown in FIG. 1A include entity graph 103, knowledge graph 105 and data sources 107.

Entity graph 103 includes a graph-based representation of entity data. Entity as used herein may refer to a user of the generative summarization dialog-based information retrieval system 102 and/or dialog-based information retrieval interface 122, a user of an application software system operating the generative summarization dialog-based information retrieval system 102 and/or dialog-based information retrieval interface 122, or another type of entity. Examples of other entity types include companies, organizations, institutions, attributes (e.g., job titles, skills), and digital content items (e.g., videos, articles, posts, comments, shares, or job postings. For example, in an online user connection network such as a social network service, an entity can include or reference a web page with which a user of the user connection network can interact via a user system, where the web page is configured to display a digital content item, such as an article, post, message, another user's profile, or profile data relating to a company, organization, institution, or a job posting.

Entity graph 103 represents entities, such as users, organizations (e.g., companies, schools, institutions), and content items (e.g., user profiles, job postings, announcements, articles, comments, and shares), as nodes of a graph. Entity graph 103 represents relationships, also referred to as mappings or links, between or among entities as edges, or combinations of edges, between the nodes of the graph. In some implementations, mappings between or among different pieces of data are represented by one or more entity graphs (e.g., relationships between users, content items, skills, and job titles). In some implementations, the edges, mappings, or links of the entity graph 103 indicate online interactions or activities relating to the entities connected by the edges, mappings, or links. For example, if a user views a content item, an edge may be created connecting the user entity with the content item entity in the entity graph, where the edge may be tagged with a label such as "viewed."

Portions of entity graph 103 can be automatically re-generated or updated from time to time based on changes and updates to the stored data, e.g., in response to updates to entity data and/or activity data. Also, entity graph 103 can refer to an entire system-wide entity graph or to only a portion of a system-wide graph, such as a sub-graph. For instance, entity graph 103 can refer to a sub-graph of a system-wide graph, where the sub-graph pertains to a particular entity or entity type.

Figure 5:
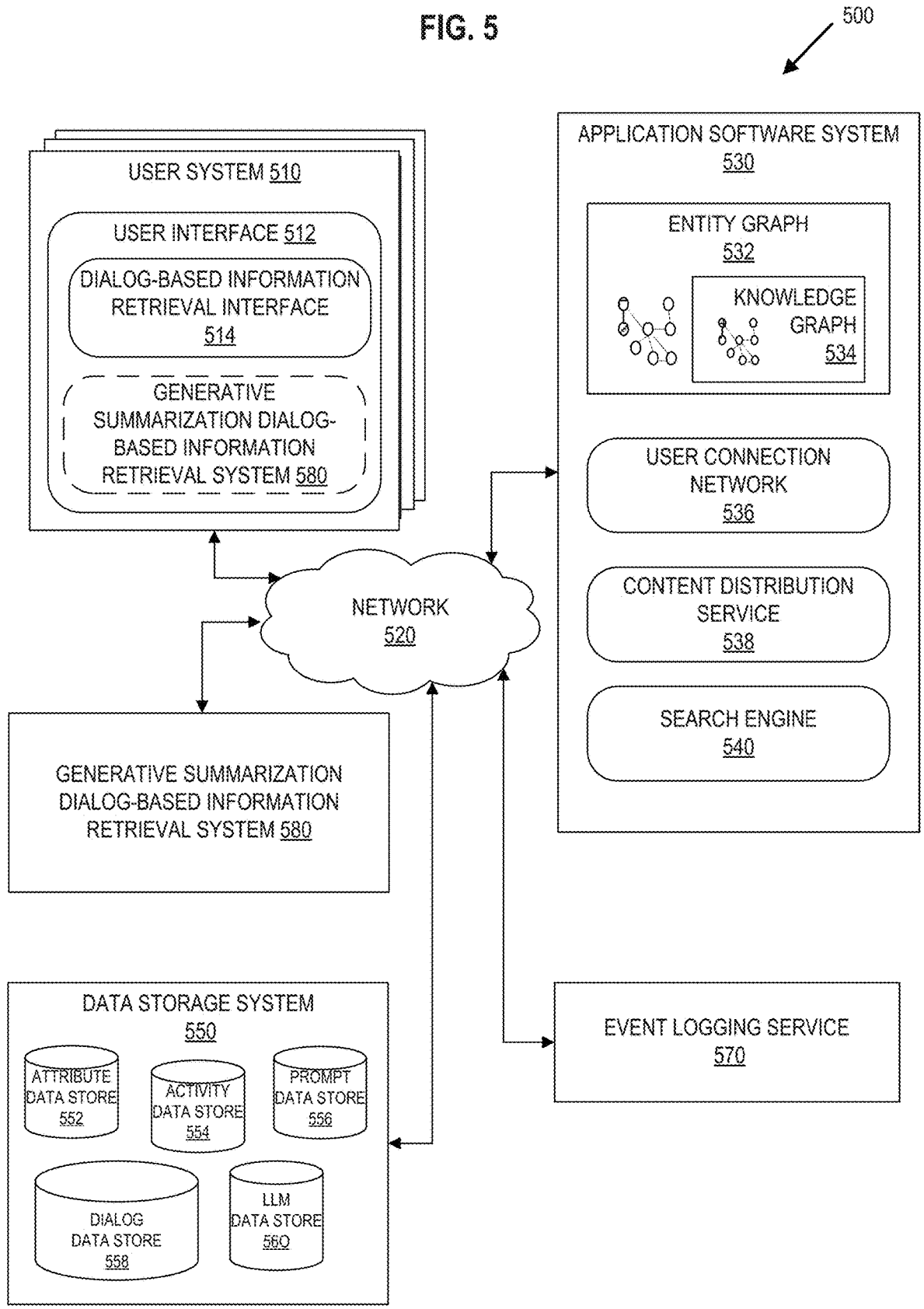
FIG. 5 is a block diagram of a computing system that includes a generative summarization dialog-based information retrieval system in accordance with some embodiments of the present disclosure.
Figure 6:
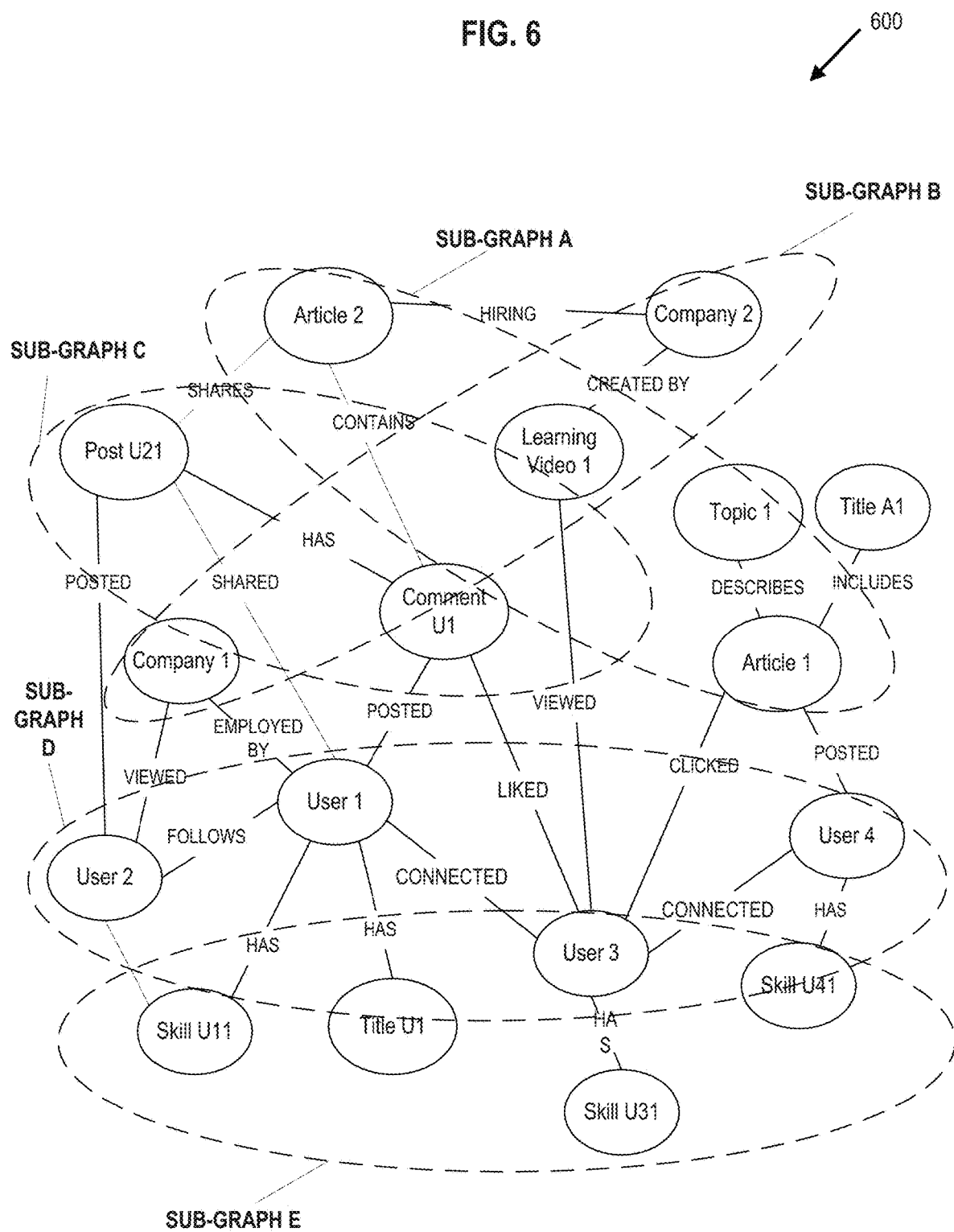
FIG. 6 is an example of an entity graph in accordance with some embodiments of the present disclosure.

Not all implementations have a knowledge graph, but in some implementations, knowledge graph 105 is a subset of entity graph 103 or a superset of entity graph 103 that also contains nodes and edges arranged in a similar manner as entity graph 103, and provides similar functionality as entity graph 103. For example, in some implementations, knowledge graph 105 includes multiple different entity graphs 103 that are joined by cross-application or cross-domain edges or links. For instance, knowledge graph 105 can join entity graphs 103 that have been created across multiple different databases or across multiple different software products. As an example, knowledge graph 105 can include links between job postings that are stored and managed by a first application software system and related company reviews that are stored and managed by a second application software system different from the first application software system. Additional or alternative examples of entity graphs and knowledge graphs are shown in FIG. 5 and FIG. 6, described below.

As shown in FIG. 1A, entity graph 103 and/or knowledge graph 105 are capable of supplying entity data 126 and/or link data 128 to search prompt generator 104. For instance, search prompt generator 104 can use entity data 126 and/or link data 128 to disambiguate or supplement portions of a dialog history. For example, search prompt generator 104 can use entity graph 103 and/or knowledge graph 105 to obtain one or more parameter values to include in a search prompt.

As shown in FIG. 1A, entity graph 103 and/or knowledge graph 105 are capable of supplying entity data 130 and/or link data 132 to response prompt generator 116. For instance, response prompt generator 116 can use entity data 130 and/or link data 132 to filter search results to be included in a response prompt. For example, response prompt generator 116 can use entity graph 103 and/or knowledge graph 105 to obtain one or more parameter values to include in a response prompt.

Data sources 107 include one or more sources of data, such as one or more data stores, processes, subprocesses, pre-processors, domain applications, and/or external systems, which can be used to supply retrieved data 134, 136 to search prompt generator 104 and/or response prompt generator 116 in a similar manner. Examples of retrieved data 130 include user profile data 109, online dialog history 111, and web content 113 (e.g., learning videos, web content, such as user profile pages and skill pages, company pages, articles, documents, images, and posts).

As used herein, pre-processor may refer to a process, subprocess, system, or application that performs one or more operations on retrieved data 130 before the data is provided to search prompt generator 104 and/or response prompt generator 116. For example, a pre-processor applies one or more mathematical operations and/or trained predictive models, such as artificial intelligence models or machine learning models (e.g., classification models, scoring models, or ranking models), to one or more portions of the retrieved data 130, and the output of the pre-processor(s) is provided to search prompt generator 104 and/or response prompt generator 116, e.g., alternatively or in addition to the raw retrieved data. In those instances where a pre-processor is used, the output of the pre-processor is considered retrieved data 130 for purposes of FIG. 1A.

An example of a pre-processor is an intent generator. An intent generator includes, for example, one or more predictive models. The intent generator inputs portions of retrieved data 130, such as user profile data, historical user activity data, dialog history, etc.) to the one or more predictive models, and in response to these inputs, the one or more predictive models outputs intent data. For example, the intent generator may include a set of binary classifiers that each classify the set of inputs as correlated or not correlated with a particular intent (e.g., job seeker or not a job seeker, etc.). In implementations that explicitly include one or more intent generators, the user intent output by the intent generator(s) can be explicitly passed to the large language model as a parameter. In other implementations, the large language model can be instructed, e.g., as part of the search prompt and/or response prompt, to determine the user's intent based on one or more sources of contextual data (e.g., user preferences, dialog history, dialog context, etc.).

Retrieved data 130 can also or alternatively include data obtained from one or more recommendation systems and/or data obtained from domain applications such as software platforms that are external to the generative summarization dialog-based information retrieval system 102 but are accessible to the generative summarization dialog-based information retrieval system 102 via, e.g., one or more APIs (application programming interfaces).

Examples of recommendation systems include machine learning models that have been trained based on historical data to score user-entity pairs, rank the user-entity pairs based on the scores, and select one or more of the top ranking user-entity pairs to formulate and output a user recommendation. Examples of data obtained from recommendation systems include user connection recommendations and content item recommendations (e.g., people you may know, articles you may be interested in). Data retrieved from a recommendation system can be used to constrain the operation of one or more generative models, e.g., large language models. For example, recommendation system output can be used by search prompt generator 104 and/or response prompt generator 116 to determine whether to include an entity in a prompt or to exclude the entity from the prompt.

Online dialog history 111 includes historical dialog portions associated with an online dialog involving a particular user. That is, each user will have a separate online dialog history 111. For example, when an online dialog is initiated between a user and the generative summarization dialog-based information retrieval system 102 (e.g., via dialog-based information retrieval interface 122), the initial dialog portion that begins the online dialog and all subsequent dialog portions involving that user are stored in online dialog history 111. For instance, in some implementations, a text file is created to store the online dialog history 111 and is updated each time a new thread or dialog portion is added to the online dialog, such that the text file contains the entire dialog history involving the user, up to the current timestamp.

Data retrieved from online dialog history can be used to constrain the operation of one or more generative models, e.g., large language models. For instance, online dialog history 111 can be used by search prompt generator 104 to disambiguate dialog portions subsequently received from the same user or to augment those subsequently received dialog portions with additional context data. As another example, online dialog history 111 can supply parameter values to be used by response prompt generator 116 in generating a response prompt, in order to constrain the response generated by the second large language model 120.

Data retrieved from web content 113 can be used to constrain the operation of one or more generative models, e.g., large language models. Examples of web content 115 that can be extracted and used by search prompt generator 104 and/or response prompt generator 116 to constrain the operations of a generative model, e.g., large language model, include articles and learning videos previously viewed by the user.

Dialog context data, such as entity data 126, 128, link data 130, 132, pre-processed data, and retrieved data 134, 136, can be provided to generative summarization dialog-based information retrieval system 102 from potentially a variety of different applications, platforms, and data sources including user interfaces, databases and other types of data stores, including online, real-time, and/or offline data sources. In the example of FIG. 1A, dialog context data are received via one or more user devices or systems, such as portable user devices like smartphones, wearable devices, tablet computers, or laptops, one or more web servers, and/or one or more database servers; however, any of the different types of dialog context data can be received by generative summarization dialog-based information retrieval system 102 via any type of electronic machine, device or system.

In operation, search prompt generator 104 receives an input portion of an online dialog 124 via a dialog-based information retrieval interface 122, e.g., an app or web page at a user device. In response to the input dialog portion 124, search prompt generator 104 formulates and outputs a search prompt 106. For example, if input dialog portion 124 is the first dialog portion in an online dialog involving a user and the system 102, then the search prompt 106 is based on the input dialog portion 124 and potentially one or more dialog context data such as entity data 126, link data 128, and/or retrieved data 136. If there have been previous rounds of dialog prior to the input dialog portion 124, then the search prompt 106 is based on the input dialog portion 124, the one or more previous rounds of dialog stored in the dialog history 111, and potentially one or more other dialog context data such as entity data 126, link data 128, and/or retrieved data 136.

Figure 1B:
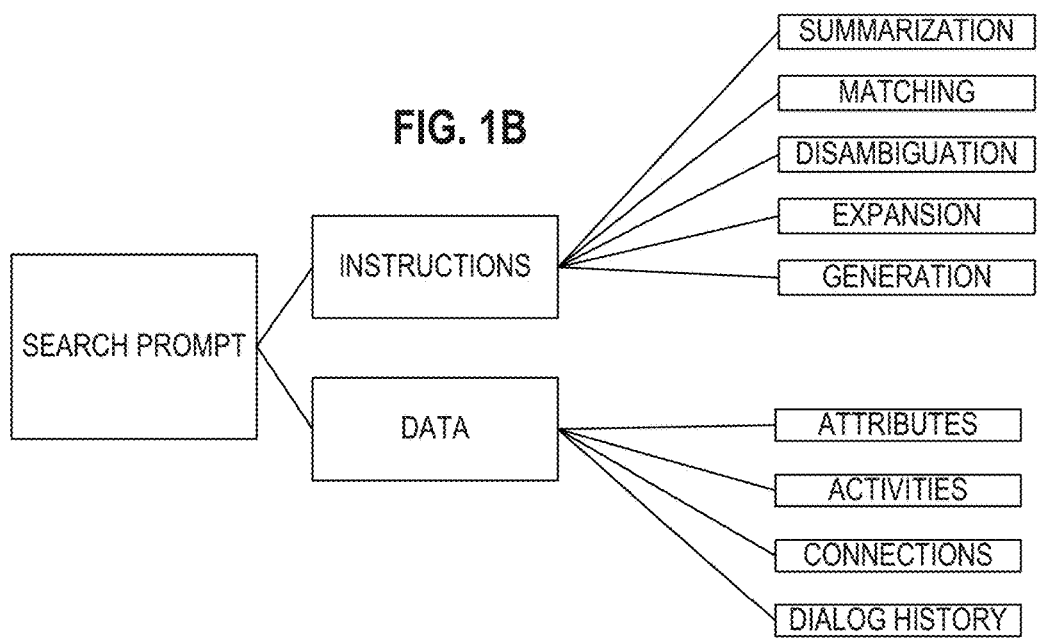
FIG. 1B is a block diagram of an example of components of a search prompt for a generative summarization dialog-based information retrieval system in accordance with some embodiments of the present disclosure.

The search prompt 106 contains one or more instructions for the first large language model 108 to generate and output a search query based on input dialog portion 124 and any constraints contained in the search prompt 106. For example, search prompt generator 104 selects a search prompt template from e.g., prompt data store 556 of FIG. 6, combines the search prompt template with the input dialog portion 124 and, optionally, one or more pieces of dialog context data, to formulate the search prompt 106. An example of a structure of a search prompt that can be generated by search prompt generator 104 to generate search prompt 106 is shown in FIG. 1B, described below.

First large language model 108 includes one or more neural network-based machine learning models. Although implementations described herein may refer to a large language model, other model architectures with similar capabilities also can be used. In some implementations, first large language model 108 is constructed using a neural network-based deep learning model architecture. In some implementations, the neural network-based architecture includes one or more input layers that receive model inputs, generate one or more embeddings based on the model inputs, and pass the one or more embeddings to one or more other layers of the neural network. In other implementations, the one or more embeddings are generated based on the model input by a pre-processor, the embeddings are input to the neural network model, and the neural network model generates output based on the embeddings.

In some implementations, the neural network-based machine learning model architecture includes one or more self-attention layers that allow the model to assign different weights to portions of the model input. Alternatively or in addition, the neural network architecture includes feed-forward layers and residual connections that allow the model to machine-learn complex data patterns including relationships between different portions of the model input in multiple different contexts. In some implementations, the neural network-based machine learning model architecture is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the generative summarization dialog-based information retrieval system 102.

In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models. In some examples, the neural network-based machine learning model architecture includes or is based on one or more predictive text neural models that can receive text input and generate one or more outputs based on processing the text with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architectures include or are based on one or more multimodal neural networks capable of outputting different modalities (e.g., text, image, sound, etc.) separately and/or in combination based on textual input. Accordingly, in some examples, a multimodal neural network implemented in the generative summarization dialog-based information retrieval system is capable of outputting digital content that includes a combination of two or more of text, images, video or audio.

In some implementations, first large language model 108 is trained on a large dataset of digital content such as natural language text, images, videos, audio files, or multi-modal data sets. For example, training samples of digital content such as natural language text extracted from publicly available data sources are used to train one or more generative models of the generative summarization dialog-based information retrieval system. The size and composition of the datasets used to train one or more models of the generative summarization dialog-based information retrieval system can vary according to the requirements of a particular design or implementation of the generative summarization dialog-based information retrieval system. In some implementations, one or more of the datasets used to train one or more models of the generative summarization dialog-based information retrieval system includes hundreds of thousands to millions or more different training samples.

In some embodiments, one or more models of generative summarization dialog-based information retrieval system includes multiple generative models trained on differently sized datasets. For example, a generative summarization dialog-based information retrieval system can include a comprehensive but low capacity generative model that is trained on a large data set and used for generating dialog portions in response to user inputs, and the same generative model also can include a less comprehensive but high capacity model that is trained on a smaller data set, where the high capacity model is used to generate outputs based on examples obtained from the low capacity model. In some implementations, reinforcement learning is used to further improve the output of one or more models of generative summarization dialog-based information retrieval system. In reinforcement learning, ground-truth examples of desired model output are paired with respective inputs, and these input-example output pairs are used to train or fine tune one or more models of generative summarization dialog-based information retrieval system.

In some implementations, one or more models of generative summarization dialog-based information retrieval system are implemented using a graph neural network. For example, a modified version of a Bidirectional Encoder Representation with Transformers (BERT) neural network is specifically configured, in one model instance, to generate and output thread classifications, and in another instance, to generate and output machine-generated dialog portions. In some implementations, the modified BERT is trained with self-supervision, e.g., by masking some portions of the input data so that the BERT learns to predict the masked data. During scoring, a masked entity is associated with a portion of the input data and the model generates output at the position of the masked entity based on the input data.

In operation, first large language model 108 receives input including search prompt 106. Search prompt 106 is communicated to first large language model 108 via, for example, an application programming interface (API). In response to search prompt 106, first large language model 108 generates and outputs search query 110. Search query 110 includes a query that can be executed by search system 112 to generate search result data 114. The search query 110 is determined, generated and output by first large language model 108 in response to the search prompt 106. The search query 110 can include raw text for portions of the search system 112 that are configured for text-based queries and/or embedding data for portions of the search system 112 that are configured for embedding-based retrieval.

Figure 1C:
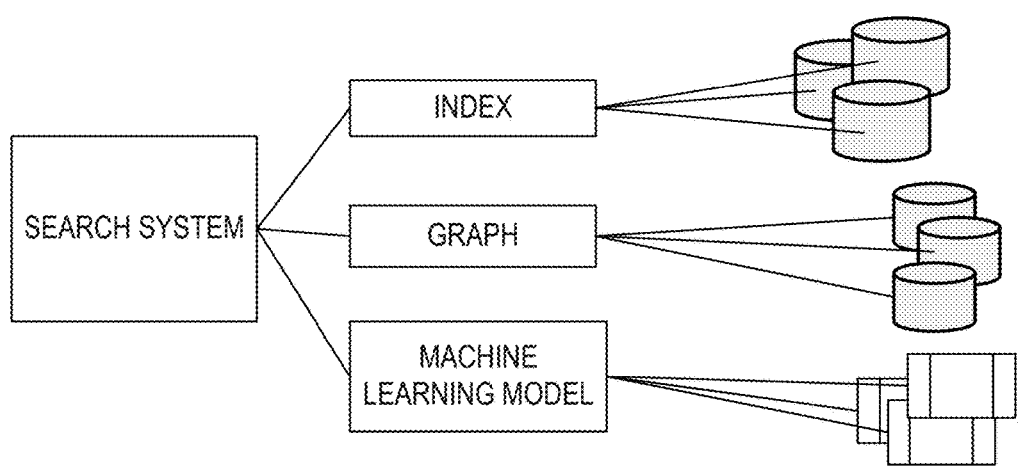
FIG. 1C is a block diagram of an example of components of a search system that can be used in connection with a generative summarization dialog-based information retrieval system in accordance with some embodiments of the present disclosure.

Search system 112 includes one or more search engines. In some implementations, search system 112 is implemented using a federated searching architecture. Portions of search system 112 can be configured to perform different types of information retrieval, such as text-based retrieval, graph-based retrieval, and/or embedding-based retrieval. An example of components that can be included in search system 112 is shown in FIG. 1C, described below.

Figure 1D:
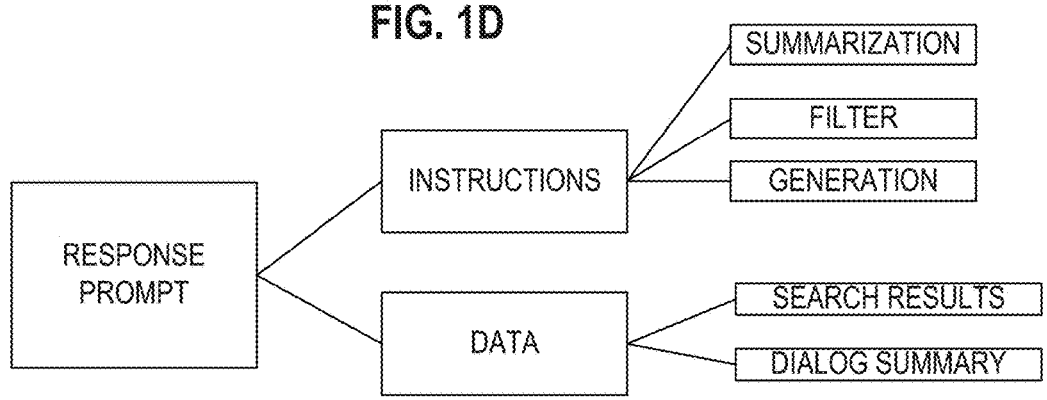
FIG. 1D is a block diagram of an example of components of a response prompt that can be used in connection with a generative summarization dialog-based information retrieval system in accordance with some embodiments of the present disclosure.

Response prompt generator 116 receives search result data 114 via search system 112. In response to the search result data 114, response prompt generator 116 formulates and outputs a response prompt 118. The response prompt 118 contains one or more instructions for the second large language model 120 to generate and output an output portion of online dialog 138 based on the search result data 114 and any constraints contained in the response prompt 106. For example, response prompt generator 116 selects a response prompt template from e.g., prompt data store 556 of FIG. 6, combines the response prompt template with the search result data 114 and, optionally, one or more pieces of dialog context data, such as entity data 130, link data 132, and/or retrieved data 134, to formulate the response prompt 118. In some implementations, the response prompt 118 includes multiple sub-prompts, where a sub-prompt includes one or more instructions related to a specific task or sub-task to be performed by the large language model. For instance, the response prompt 118 can include one or more information retrieval instructions, one or more relevance instructions, and/or one or more response generation instructions. An example of a structure of a response prompt that can be generated by response prompt generator 116 to generate response prompt 118 is shown in FIG. 1D, described below.

Second large language model 120 includes one or more neural network-based machine learning models, such as any of the types of models described above with reference to first large language model 108. In some implementations, second large language model 120 includes first large language model 108. For example, first large language model 108 and second large language model 120 can be, or can be included in, the same large language model. In some implementations, second large language model 120 and first large language model 108 have the same model architecture but are trained differently. For example, in some implementations, first large language model 108 is trained on a large dataset of digital content while second large language model 120 is pre-trained on the same large dataset but then tuned for a specific task type, such as career coaching, education or training, health or wellness coaching, etc.

In operation, second large language model 120 machine-generates and outputs the output portion of online dialog 138. Examples of output portion of online dialog 138 include natural language text and/or multi-model content, such as conversational questions, online and/or human resource recommendations including links to relevant articles, videos, instructor pages, skills pages, etc. Additional examples of output portion of online dialog 138 are shown in the user interface screen capture figures described herein.

Taken together, input portion of online dialog 124 and output portion of online dialog 138 constitute a thread of an online dialog. The thread can include other user-generated dialog portions and/or machine-generated dialog portions that occur either prior to or subsequent to the dialog portions 124, 138. For example, an online dialog can include several rounds of dialog including multiple user-generated dialog portions and machine-generated dialog portions, and the online dialog can continue over a variable time interval such as several minutes or intermittently over hours, days, or weeks. Each time an additional dialog portion, whether user-generated or system-generated, is added to the online dialog, it is added (e.g., appended) to the dialog history 111 so that search prompt generator 104 and response prompt generator 116 can each access the entire dialog history to formulate their respective prompts.

The dialog-based information retrieval interface 122 includes a front end component through which a user can interact with the generative summarization dialog-based information retrieval system 102 at the user's electronic device. For example, the dialog-based information retrieval interface 122 displays an online dialog including the input portion of online dialog 124 and the output portion of online dialog 138.

The examples shown in FIG. 1A and the accompanying description, above are provided for illustration purposes. This disclosure is not limited to the described examples. Additional or alternative details and implementations are described herein.

FIG. 1B is a block diagram of an example of components of a search prompt for a generative summarization dialog-based information retrieval system in accordance with some embodiments of the present disclosure.

In FIG. 1B, a search prompt 150 includes a set of instructions and a set of placeholders for data upon which the set of instructions is to operate. The set of instructions can include one or more of the following: one or more summarization instructions, one or more matching instructions, one or more disambiguation instructions, one or more expansion instructions, and/or one or more generation instructions.

Examples of summarization instructions include natural language text that instructs a large language model to generate a summary of an input or set of inputs. For example, a search prompt can include a summarization instruction that instructs a large language model to retrieve and generate a summary of the user's dialog history. Alternatively or in addition, a search prompt can include a summarization instruction that instructs a large language model to retrieve and generate a summary of the user's dialog context; for example, a summary of the user's profile data. The generative summaries output as a result of execution of summarization instructions by the large language model are persisted in memory so that they can be used as input to one or more downstream processes such as one or more of a matching, disambiguation, expansion, or generation instruction.

In natural language processing (NLP), extractive and generative approaches for summarizing information exist. In extractive approaches, the NLP system identifies key sentences within the input text sought to be summarized, extracts only those key sentences and includes them in the summary. Thus, with extractive summarization, the resulting summary produced by the extractive NLP contains exact sentences from the original input text. In generative approaches, the NLP system does not extract exact text from the original input but instead machine-generates new text (e.g., sentences, phrases, paragraphs, etc.) that represents the meaning or substance of the entire original input. One or more embodiments of the disclosed technologies utilize generative summarization approaches.

Examples of matching instructions include natural language text that instructs a large language model to compare pieces of data. The matching instruction can, for example, instruct the large language model to generate a matching score for a pair of inputs and determine whether the inputs match based on the score, or rank a set of data items based on matching scores computed between each data item and an input. For example, a search prompt can include a matching instruction that instructs a large language model to match a user's dialog history with a current input portion of a dialog, or a matching instruction that instructs a large language model to match a user's dialog context (e.g., attribute data or activity data) with a current input portion of a dialog.

Match or matching as used herein may refer to an exact match or an approximate match, e.g., a match based on a computation of similarity between two pieces of data. An example of a similarity computation is cosine similarity. Other approaches that can be used to determine similarity between or among pieces of data include clustering algorithms (e.g., k means clustering), binary classifiers trained to determine whether two items in a pair are similar or not similar, and neural network-based vectorization techniques such as WORD2VEC. In some implementations, generative language models, such as large language models, are used to determine similarity of pieces of data.

Examples of disambiguation instructions include natural language text that instructs a large language model to replace an ambiguous portion of text with unambiguous text. Ambiguous as used herein may refer to a word, phrase, or sentence that has at least two different meanings. For example, a search prompt can include a disambiguation instruction that instructs a large language model to replace a word or phrase of an input portion of a dialog with one or more alternative words or phrases; e.g., replace a common noun with a proper noun, or replace a category with specific examples. For instance, if output of a large language model's execution of a matching instruction indicates that a portion of a summary of the user's dialog history matches an input portion of a dialog, a disambiguation instruction can instruct the large language model to replace a word or phrase of the input portion with a word or phrase of the summary of the dialog history.

For example, if an input portion of the dialog includes the word "promote" and the dialog history contains a prior discussion of career advancement, a disambiguation instruction could instruct the large language model to interpret "promote" as "advance my career" and not as "marketing or sales promotion." Similarly, if output of a large language model's execution of a matching instruction indicates that a portion of a dialog context matches an input portion of a dialog, a disambiguation instruction can instruct the large language model to replace a word or phrase of the input portion with a word or phrase of the dialog context. As another example, if an input portion of the dialog includes the phrase "how should I update my skills?", a disambiguation instruction could instruct the large language model to replace the general reference to "my skills" with a list of specific skills extracted from the user's online profile.

Examples of expansion instructions include natural language text that instructs a large language model to add additional words or phrases to an input portion of a dialog to supplement the words or phrases already contained in the original input portion of the dialog. For example, if an input portion of the dialog mentions the skill "leadership," an expansion instruction could instruct the large language model to add, to the input portion of the dialog, one or more skills from a summary of the user's dialog context (e.g., a summary of the user's online profile) that are related to leadership in the user's particular industry, such as project management, strategic thinking, creativity, public speaking, etc.

Examples of generation instructions include natural language text that instructs a large language model to machine-generate and output new digital content, such as new natural language text alone or in combination with one or more other forms of digital content (e.g., video, audio, imagery, hyperlinks, etc.). For example, a generation instruction of a search prompt could instruct the large language model to use the output of one or more of the summarization, matching, disambiguation, and expansion instructions to generate a search query.

The data to which the instructions contained in the search prompt are applied can include one or more of the following: attributes, activities, connections, and/or dialog history.

Examples of attributes include attribute data extracted from the user's dialog history and/or dialog context, such as skills, job titles, educational experiences, etc. Examples of activities include activity data extracted from the user's dialog history and/or dialog context, such as titles of previously-viewed content items, likes or follows of skill pages, thought leaders, authors, or instructors, etc. Examples of connections include connections among users of a social network service, such as connections among the user and other entities of a social network service, such as other users, companies, and/or content items. Attributes, activities, and/or connections can be determined and obtained via one or more entity graphs. An example of a dialog history includes previous rounds of dialog involving the user and the online system.

An example of a search prompt that may be generated using the disclosed technologies is shown in Table 1 below.

TABLE 1

Example of search prompt.

General instructions

Based on the input portion of the dialog, the dialog history, and the dialog context, generate a search query as follows:
First, summarize the dialog history.
Second, use the summary of the dialog history to perform entity tagging on the input portion of the dialog.
Third, use the dialog context to disambiguate or expand the output of the second instruction.
Fourth, use the output of the third instruction to generate the search query.

TABLE 1-continued

Example of search prompt.

Context dialog context: {memory.user_profile}
dialog history: {memory.dialog}
user input: {lastUserInput}
categories: [course recommendations . . . ]
category descriptions:
course recommendations: questions on recommending relevant online courses to a user
. . .

Output indicator

Desired format for the final answer: natural language text for text-based retrieval from an index or graph
""""

As shown in Table 1, the example search prompt contains multiple instructions, including subsequent instructions that operate on the output of the previously executed instruction or instructions, to be executed by a large language model. In the example of Table 1, each instruction identifies a specific instruction type (e.g., summarize, match, disambiguate, expand, or generate) and input data upon which the instruction is to operate (e.g., the summary of the dialog history, the output of the previous instruction). Also in the example of Table 1, the search prompt instructs the large language model to formulate the output using a specific query format. A search prompt can include multiple different output indicators if the query generated by the large language model is to be executed against different data sources or if the search prompt contains multiple different queries to be executed against different data sources.

In some implementations, the search prompt can include any one or more of the following: a specific instruction to perform a set of steps in a specific order (e.g., "to build the search query, follow these steps"), a specific instruction to analyze the user's input and determine the user's intent (e.g., "analyze the user's message to understand their question or the sub-topics they're interested in."), a specific instruction for how the large language model should respond to a lack of information in the user's input (e.g., "if no question is present, use the current sub-topic"), one or more specific examples of how the large language model should formulate output (e.g., "Example: 'I would recommend the user learn the following skills: Skill1, Skill2, . . . , SkillN'"), one or more constraints, such as a specific limit on the length of the search query to be generated, specific filters and/or facets to include in or exclude from the generated search query, specific terms and/or operators that the large language model should include in the search query, one or more constraints on the amount of information used to generate the search query (e.g., "extract at least 10 specific terms from the context data, emphasizing the importance of specificity and relevance.").

FIG. 1C is a block diagram of an example of components of a search system that can be used in connection with a generative summarization dialog-based information retrieval system in accordance with some embodiments of the present disclosure.

In FIG. 1C, a search system 170 includes query processors that are capable of processing and executing search queries on one or more of an index, a graph, or a machine learning model. For example, search system 170 can include a query processor capable of processing executing a text-based query on a stored search index to retrieve a set of search results that match the text-based query. As another example, search system 170 can include a query processor capable of processing and executing a graph query on one or more stored graphs, such as entity graph 103 and/or knowledge graph 105, to retrieve a set of search results (e.g., a set of nodes, a set of links, or one or more sub-graphs) that match the graph query. As another example, search system 170 can include a query processor capable of processing and executing an embedding-based query via one or more trained machine learning models, such as ranking models, scoring models, classification models, or recommendation systems, to retrieve a set of one or more entity recommendations (e.g., course recommendations, connection recommendations, article recommendations) that match the embedding-based query.

FIG. 1D is a block diagram of an example of components of a response prompt that can be used in connection with a generative summarization dialog-based information retrieval system in accordance with some embodiments of the present disclosure.

In FIG. 1D, a response prompt 150 includes a set of instructions and a set of placeholders for data upon which the set of instructions is to operate. In some embodiments, the set of instructions can include one or more of the following: one or more summarization instructions, one or more relevance instructions, one or more filter instructions, and/or one or more generation instructions.

Examples of summarization instructions include natural language text that instructs a large language model to generate a summary of a set of search results generated by the search system. For example, a response prompt can include a summarization instruction that instructs a large language model to generate a summary of a set of digital content items (e.g., articles, learning videos, etc.) retrieved by the search system in response to a search prompt. The generative summaries output as a result of execution of summarization instructions by the large language model are persisted in memory so that they can be used as input to one or more downstream processes such as one or more of a relevance instruction, filter instruction, or generation instruction.

Examples of relevance instructions include natural language text that includes search result data in the instruction, instructs a large language model to determine and identify which search result data is relevant to the user's request, and instructs the large language model to use the search result data that it has identified as relevant to the user's request to respond to the user's request and/or to include one or more portions of the identified relevant content in the system-generated response.

Examples of filter instructions include natural language text that instructs a large language model to filter a set of search results generated by the search system based on a summary of the user's dialog history or a summary of the user's dialog context. For example, a response prompt can include a filter instruction that instructs a large language model to, based on the summary of the user's dialog context, remove beginner-level content items from a set of search results retrieved by the search system in response to a search prompt.

Examples of generation instructions include natural language text that instructs a large language model to machine-generate and output new digital content, such as new natural language text alone or in combination with one or more other forms of digital content (e.g., video, audio, imagery, hyperlinks, etc.). For example, a generation instruction of a response prompt could instruct the large language model to use the output of one or more of the summarization or filter instructions to generate a natural language response to the input portion of the dialog from which the search prompt was generated.

Alternatively or in addition, the generation instructions can include one or more instructions to further tailor the output based on user-specific preferences and/or contextual data. For instance, after a large language model generates and outputs a summary based on the search result data retrieved by the search system, an instruction can further cause the large language model to modify, revise, or re-format that summary, for instance by ranking and/or filtering information contained in the summary based upon, for example, the entity data, dialog history, connections, etc., of the user. As an example, the large language model could re-formulate the summary so that the summary is further customized or personalized to the specific user even if/after the search prompt is also customized or personalized for the user. In other words, either or both of the search prompt and response prompt can be configured to instruct a large language model to use contextual data, user preferences, dialog history, etc. to generate the resulting output of the large language model.

The data referenced in FIG. 1D can include one or more of the following: search results and/or dialog summary. Search results can include one or more output of the search system, e.g., a set of digital content items that match the search query generated by the large language model based on the search prompt. Dialog summary can include a summary of the user's dialog history and/or a summary of the user's dialog context. The dialog summary can refer to the output of one or more summarization instructions of the search prompt. For example, one or more summaries generated by the search prompt generator in the course of preparing the search prompt can be stored in memory for downstream use by the response generator.

An example of a response prompt that may be generated using the disclosed technologies is shown in Table 2 below.

TABLE 2

Example of response prompt.

General instructions

Based on the search result data, the input portion of the dialog, the dialog summary, generate a response to the input portion of the dialog as follows:
First, fetch the search result data from the search system.
Second, generate a summary of the search result data.
Third, use the dialog summary to filter low-scoring items from the search result data.
Fourth, use the output of the third instruction to generate and output a response using conversational natural language and a professional tone.
Mention the user's name.
Output indicator Desired format for the final answer: natural language text
""""""

As shown in Table 2, the example response prompt contains multiple instructions, including subsequent instructions that operate on the output of the previously executed instruction or instructions, to be executed by a large language model. In the example of Table 2, each instruction identifies a specific instruction type (e.g., fetch, summarize, filter, or generate) and input data upon which the instruction is to operate (e.g., the search result data, the dialog summary, the output of the previous instruction). Also in the example of Table 2, the response prompt instructs the large language model to formulate the output using a specific output format.

A response prompt can include multiple different output indicators if the response is to include multiple different types of output (e.g., text, video, audio, hyperlinks, etc.).

In some implementations, the response prompt incudes any one or more of the following: one or more instructions to review information retrieved from one or more specific data sources, one or more conditional instructions (e.g., "if you have identified a specific user objective, goal, or challenge, then, create advice specific basedonlyon the user-specific objective, goal, or challenge you have identified."), one or more instructions to provide one or more concrete examples as part of the response to the user request, one or more specific requirements for the system-generated output (e.g., "Alwaysend your response with a targeted question. Avoid 'yes' or 'no' questions."), one or more hard constraints (e.g., "include advice aroundonly one conceptper message. Do not repeat yourself and keep the advice focused on the user's request. Do not use information that is not relevant to the current topic."), one or more soft constraints (e.g., "You may optionally use the dialog summaries and/or dialog context to help determine relevant content.")

Figure 2A:
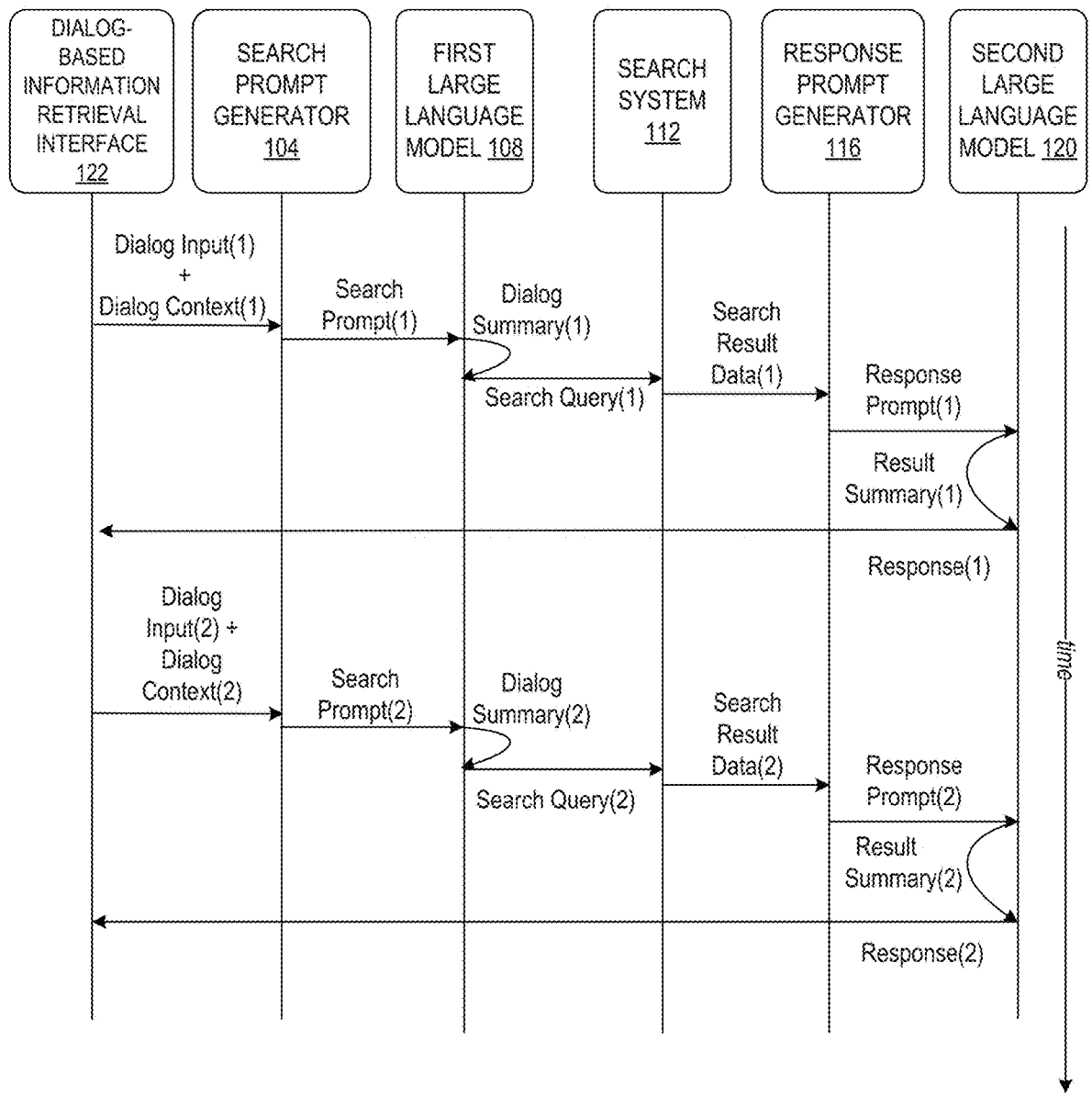
FIG. 2A is a timing diagram showing an example of communications between dialog-based information retrieval interface and components of a generative summarization dialog-based information retrieval system in accordance with some embodiments of the present disclosure.

FIG. 2A is a timing diagram showing an example of communications between dialog-based information retrieval interface and components of a generative summarization dialog-based information retrieval system in accordance with some embodiments of the present disclosure. For example, FIG. 2A shows how generative summarization can be incorporated into the generation of output by the large language models. FIG. 2A also shows how the dialog input and dialog context can be updated to produce new prompts at each successive round of dialog.

In FIG. 2A, the communications represented by labeled arrows occur in a temporal sequence, e.g., a dialog history (1) communication from dialog-based information retrieval interface 122 to search prompt generator 104 occurs at a first time instance, and a search prompt(1) communication from search prompt generator 104 to first large language model 108 occurs at a second time instance that follows the first time instance.

In the example of FIG. 2A, search prompt generator 104 receives dialog input(1) and/or dialog context(1) via dialog-based information retrieval interface 122. Dialog context(1) can include one or more previous rounds of dialog between the user and the system, e.g., dialog history. Search prompt generator 104 generates search prompt(1) based on the dialog input(1) and/or dialog context(1) and sends search prompt(1) to first large language model 108.

First large language model 108 receives the search prompt (1), generates a dialog summary(1) based on the dialog history(1) and/or dialog context(1), and uses the dialog summary(1) to generate and output search query(1).

Search system 112 receives search query(1) via first large language model 108, executes search query(1) on, e.g., one or more indexes, one or more graphs, one or more machine learning models, and/or one or more data stores, and generates search result data (1) based on the output of the execution of search query(1).

Response prompt generator 116 receives search result data (1) via search system 112. Response prompt generator 116 generates and outputs response prompt(1). Second large language model 120 receives response prompt(1) via response prompt generator 116. Second large language model 120 generates result summary(1) based on the search result data (1). Second large language model 120 generates and outputs response(1) based on the result summary(1). Dialog-based information retrieval interface 122 receives response(1) via second large language model 120. Dialog-based information retrieval interface 122 displays response (1) in response to dialog input(1).

Based on the response(1), search prompt generator 104 receives dialog input(2) and/or dialog context(2) via dialog-based information retrieval interface 122. Dialog context(2) can include the previous round of dialog, e.g., dialog input (1) and response(1). Alternatively or additionally, dialog context(2) can include cumulative dialog context, e.g., dialog context(1) plus any new dialog context that has occurred since the time instance at which dialog context(1) was generated. For instance, dialog context(2) can include profile updates, views, likes, follows, connections, etc. that have been logged for the user since the generation of dialog context(1). Search prompt generator 104 generates search prompt(2) based on the dialog input(2) and/or dialog context (2) and sends search prompt(2) to first large language model 108.

First large language model 108 receives the search prompt (2), generates a dialogue summary(2) based on the dialog history(2) and/or dialog context(2), and uses the dialog summary(2) to generate and output search query(2).

Search system 112 receives search query(2) via first large language model 108, executes search query(2) on, e.g., one or more indexes, one or more graphs, one or more machine learning models, and/or one or more data stores, and generates search result data(2) based on the output of the execution of search query(2).

Response prompt generator 116 receives search result data(2) via search system 112. Response prompt generator 116 generates and outputs response prompt(2). Second large language model 120 receives response prompt(2) via response prompt generator 116. Second large language model 120 generates result summary(2) based on the search result data(2). Second large language model 120 generates and outputs response(2) based on the result summary(2). Dialog-based information retrieval interface 122 receives response(2) via second large language model 120. Dialog-based information retrieval interface 122 displays response (2) in response to dialog input(2).

As shown in FIG. 2A, the dialog history and/or dialog context can be continuously updated as the online dialog progresses through subsequent rounds of dialog. As the dialog history and/or dialog context are updated, the amount of data stored in the dialog history and/or dialog context increases. The generative summarization aspects of the search prompt can be used to condense the amount of data used as input to the first large language model to generate the search query, and to focus the search query generation on the key substantive aspects of the dialog history and/or dialog context.

For example, the generative summarization aspects of the search prompt can be selectively tuned based on the size of the dialog history and/or dialog context. For instance, in early rounds of dialog, there may be a much smaller amount of dialog history than dialog context. As a result, the search prompt may instruct the first large language model to apply the generative summarization to the dialog context but not to the dialog history. Similarly, in later rounds of dialog, the dialog history may contain sufficient information to populate a search query without dialog context, such that the search prompt may instruct the first large language model to apply the generative summarization to the dialog history only without using the dialog context.

In some examples, the first large language model may generate and output more focused or narrower search queries based on the dialog history and/or dialog context, for example as the online dialog progresses through successive rounds. For instance, particularly in earlier rounds of dialog, the generative summarization aspects of the response prompt can be used to condense the amount of search result data used as input to the second large language model to generate the response query, and to focus the response generation on the key substantive aspects of the search result data.

For example, the generative summarization aspects of the response prompt can be selectively tuned based on the size of the search result data, the dialog context, and/or the dialog history. For instance, in early rounds of dialog, there may be a large amount of search result data because the user requests are broader or imprecise. As a result, the search response may instruct the second large language model to apply the generative summarization to the search result data during those earlier rounds of dialog. Similarly, in later rounds of dialog, the search result data may include fewer results because the user requests are more focused, such that the response prompt may instruct the second large language model not to apply the generative summarization to the search result data but instead output the search result data without any summarization.

The examples shown in FIG. 2A and the accompanying description, above are provided for illustration purposes. This disclosure is not limited to the described examples. Additional or alternative details and implementations are described herein.

FIG. 2B is a flow diagram showing an example of communications among a search system and a generative summarization dialog-based information retrieval system in accordance with some embodiments of the present disclosure. For example, FIG. 2B shows how a search system can be incorporated into the generation of output by the large language models.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a computing system 100, or by generative summarization dialog-based information retrieval system 102 of FIG. 1A, including, in some embodiments, components shown in FIG. 1A that may not be specifically shown in FIG. 2B, or by components of generative summarization dialog-based information retrieval system 580 of FIG. 5, including, in some embodiments, components shown in FIG. 5 that may not be specifically shown in FIG. 2B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 2B, at a time instance 1, a dialog history 1 is received by a search prompt generator 202. Embodiments of search prompt generator 202 include, for example, search prompt generator 104. Search prompt generator 202 generates and outputs a search prompt 1 based on dialog history 1. Search prompt generator 202 sends search prompt 1 to first generative model 204. First generative model 204 includes, for example, first large language model 108. First generative model 204 generates and outputs search query 1 in response to search prompt 1 based on dialog history 1. Decision block 206 determines whether search query 1 is to be executed by search system 208 or whether a response prompt is to be created. Embodiments of search system 208 include, for example, search system 112. For example, if search query 1 does not contain sufficient information to be executed efficiently by search system 208 (e.g., the search query 1 contains one or more ambiguous terms), decision block 206 can determine to create a response prompt that asks the user to clarify their request. If decision block 206 determines to create a response prompt, response prompt generator 210 generates and outputs response prompt 1.

Response prompt generator 210 includes, for example, response prompt generator 116. Second generative model 212 receives response prompt 1 via response prompt generator 210. Second generative model 212 includes, for example, second large language model 120. Second generative model 212 generates and outputs response 1 based on response prompt 1. Response 1 is displayed to the user via, e.g., a retrieval interface such as dialog-based information retrieval interface 122, and stored in the dialog history.

If decision block 206 determines to execute search query 1, search system 208 executes search query 1 on, e.g., one or more data sources, such as data sources 107 and/or entity graph 103, 105, to generate and output retrieved data 209. Retrieved data 209 is returned to decision block 206 for possible use in the creation of a response prompt.

After one or more subsequent rounds of dialog, for example, at a time instance N, where N is greater than 1, after the system receives subsequent input from the user in response to a request for clarification, the dialog history is updated to include the subsequent round(s) of dialog at dialog history N. The search prompt generator 202 generates and outputs search prompt N based on dialog history N. The first generative model 204 generates and outputs search query N based on the search prompt N. Decision block 206 determines whether to generate a response prompt or pass the search query N to the search system 208. For example, if search query N does not contain any ambiguous terms, decision block 206 can pass the search query N to the search system 208. After receiving retrieved data 209 from the search system 208 in response to search query N, or after determining to generate a response without executing the search query N by the search system 208, decision block 206 forwards one or more of the search query N and/or the retrieved data 209 to response prompt generator 210. Response prompt generator 210 generates response prompt N based on one or more of the search query N and/or retrieved data 209. Second generative model generates and outputs response N based on the response prompt N. Response prompt N is provided to the user interface and stored in the dialog history.

The examples shown in FIG. 2B and the accompanying description, above are provided for illustration purposes. This disclosure is not limited to the described examples. Additional or alternative details and implementations are described herein.

Figure 2C:
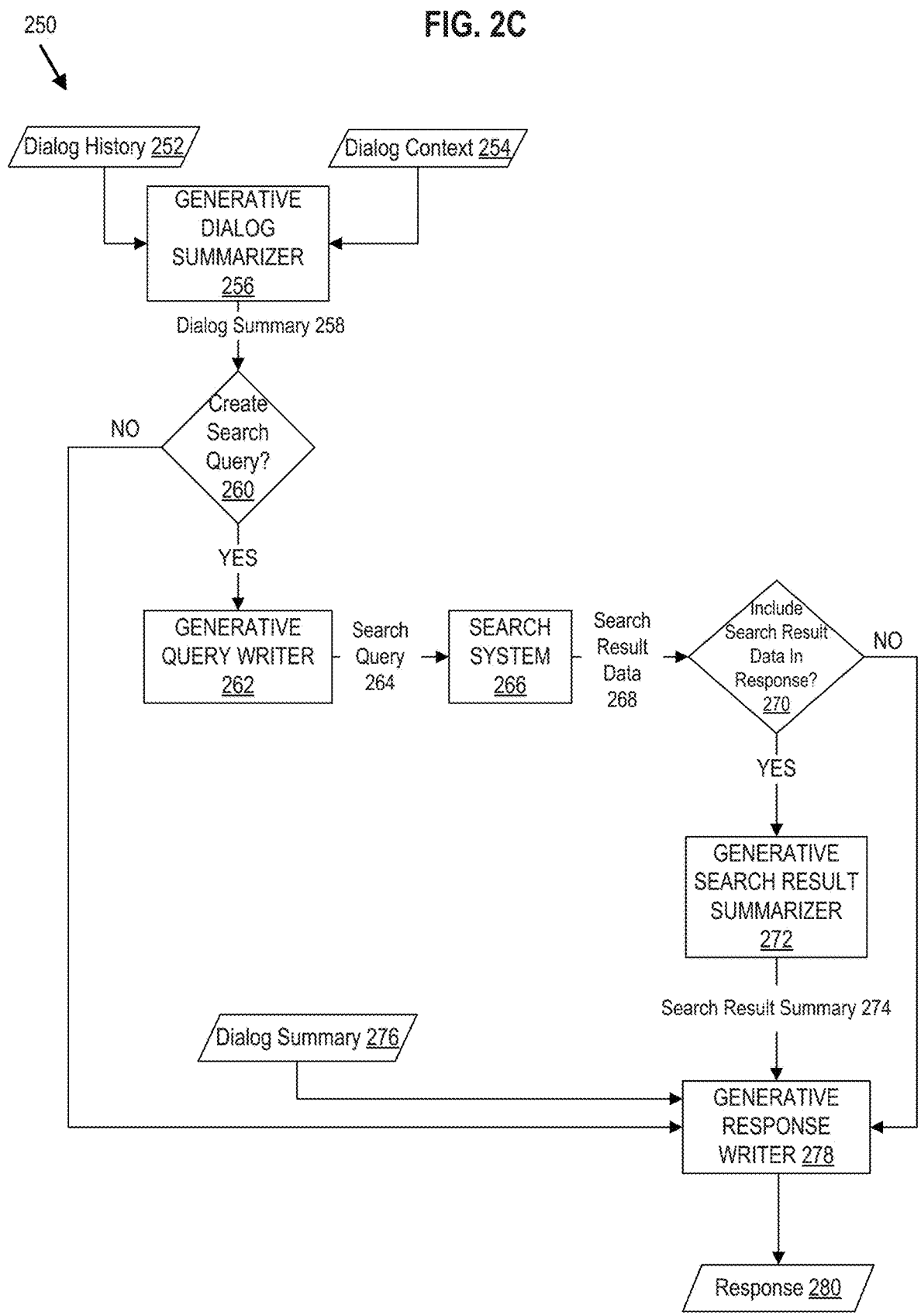
FIG. 2C is a flow diagram showing an example of communications among a search system and a generative summarization dialog-based information retrieval system in accordance with some embodiments of the present disclosure.

FIG. 2C is a flow diagram showing an example of communications among a search system and a generative summarization dialog-based information retrieval system in accordance with some embodiments of the present disclosure. For example, FIG. 2C shows how generative summarization functions can be incorporated into a flow 250 for generating responses to dialog input.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a computing system 100, or by generative summarization dialog-based information retrieval system 102 of FIG. 1A, including, in some embodiments, components shown in FIG. 1A that may not be specifically shown in FIG. 1B, or by components of generative summarization dialog-based information retrieval system 580 of FIG. 5, including, in some embodiments, components shown in FIG. 5 that may not be specifically shown in FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 2C, a generative dialog summarizer 256 generates a dialog summary 258 based on one or more of a dialog history 252 or a dialog context 254, using one or more generative models. In some embodiments, generative dialog summarizer 256 is a component or sub-process of search prompt generator 104. Dialog history 252 can include a current input portion of an online dialog alone or in combination with one or more previous rounds of dialog involving a user and an online system. Dialog context 254 can include one or more data sources such as data sources 107. For example, in some embodiments, if the user has not provided any input portions of an online dialog, generative dialog summarizer 256 can generate and output dialog summary 258 based only on dialog context 254 and/or based only on previous rounds of dialog contained in dialog history 252.

Decision block 260 determines whether to create a search query based on the dialog summary 258. For example, decision block 260 determines whether generative dialog summarizer 256 is able to generate a dialog summary 258 or whether the dialog summary 258 contains any ambiguous words or phrases. If decision block 260 determines not to create a search query, the flow 250 proceeds to generative response writer 278. If decision block 260 determines to create a search query, generative query writer 262 generates and outputs search query 264, using one or more generative models. In some embodiments, generative query writer 262 is a component or sub-process of search prompt generator 104 and/or first large language model 108.

Search system 266 executes search query 264 against one or more data sources, such as one or more indexes, graphs, and/or machine learning models. Search system 266 generates and outputs search result data 268 based on search query 264.

Decision block 270 determines whether to include search result data 268 in a response to be presented to the user. For example, decision block 270 determines whether the search result data 268 contains at least a minimum number of search results, where the minimum number is at least one and determined based on the requirements of a particular design or implementation of the system.

If decision block 270 determines not to include search result data 268 in a response, the flow 250 proceeds to generative response writer 278. If decision block 270 determines to include search result data 268 in a response, generative search result summarizer 272 generates and outputs search result summary 274 based on search result data 268. Search result summary 274 is, for example, a generative summary of search result data 268. In some embodiments, generative search result summarizer 272 is a component or sub-process of response prompt generator 116.

Generative response writer 278 generates and outputs response 280 based on one or more of search result summary 274 or dialog summary 276. In some embodiments, generative response writer 278 is a component or sub-process of response prompt generator 116 and/or second large language model 120. Dialog summary 276 includes dialog summary 258 and any additional rounds of dialog that have been added to the online dialog since dialog summary 258 was created. Response 280 includes, for example, natural language text to be presented to the user alone or in combination with other digital content.

As shown in FIG. 2C, the placement of generative dialog summarizer 256 before generative query writer 262 in flow 250, and/or the placement of generative search result summarizer 272 before generative response writer 278 in the flow 250, can help ensure that the inputs to the generative query writer 262 and/or generative response writer 278 are concise and/or unambiguous regardless of whether the user's actual request is concise or unambiguous, thereby helping to conserve computing resources and improve the final response 280

The examples shown in FIG. 2C and the accompanying description, above are provided for illustration purposes. This disclosure is not limited to the described examples. Additional or alternative details and implementations are described herein.

FIG. 3A, FIG. 3B, FIG. 3C, FIG. 3D, and FIG. 3E illustrate an example of at least one flow including screen captures of user interface screens configured to provide generative summarization dialog-based information retrieval in accordance with some embodiments of the present disclosure.

In the user interfaces shown in FIG. 3A, FIG. 3B, FIG. 3C, FIG. 3D, and FIG. 3E, certain data that would normally be displayed may be anonymized for the purpose of this disclosure. For instance, in a live example, the actual data and not the anonymized version would be displayed. For example, the text "JobTitle" would be replaced with an actual job title (e.g., software engineer) and "FirstName LastName" would be replaced with a user's actual name. The user interfaces shown in FIG. 3A, FIG. 3B, FIG. 3C, FIG. 3D, and FIG. 3E are presented by an application software system, such as an information retrieval system, to a user who wants their computing device to assist them with an information retrieval task. In some implementations, the user interfaces are each implemented as a web page that is stored, e.g., at a server or in a cache of a user device, and then loaded into a display of a user device via the user device sending a page load request to the server. The icons and the selection and arrangement of elements shown in the user interfaces are copyright 2023. LinkedIn Corporation, all rights reserved. The graphical user interface control elements (e.g., fields, boxes, buttons, etc.) shown in the screen captures are implemented via software used to construct the user interface screens. While the screen captures illustrate examples of user interface screens, e.g., visual displays such as digital, e.g., online forms or web pages, this disclosure is not limited to online forms or web page implementations, visual displays, or graphical user interfaces. In other implementations, for instance, audio-based user interface including an embedded audio system (e.g., microphone, speech processing software, and speaker) is used alternatively or in addition to a graphical user interface.

The user interfaces shown in FIG. 3A, FIG. 3B, FIG. 3C, FIG. 3D, and FIG. 3E provide examples of capabilities of a generative summarization dialog-based information retrieval system as described herein, including the ability to offer user-personalized content recommendations to a user in the context of an online dialog. In some implementations, different contextual resources can be used in different ways in different threads of the online dialog. For example, in one thread, a recommendation system may be used to obtain a set of course recommendations which are included in a prompt such that a large language model is instructed to summarize the set of course recommendations based on the user's skill set or job title. In another thread, the user's profile (e.g., web page) may be obtained from, e.g., a social network service or other application software system, and then the user's profile may be included in a prompt such that a large language model is instructed to generate a search query based on the user's profile.

Figure 3A:
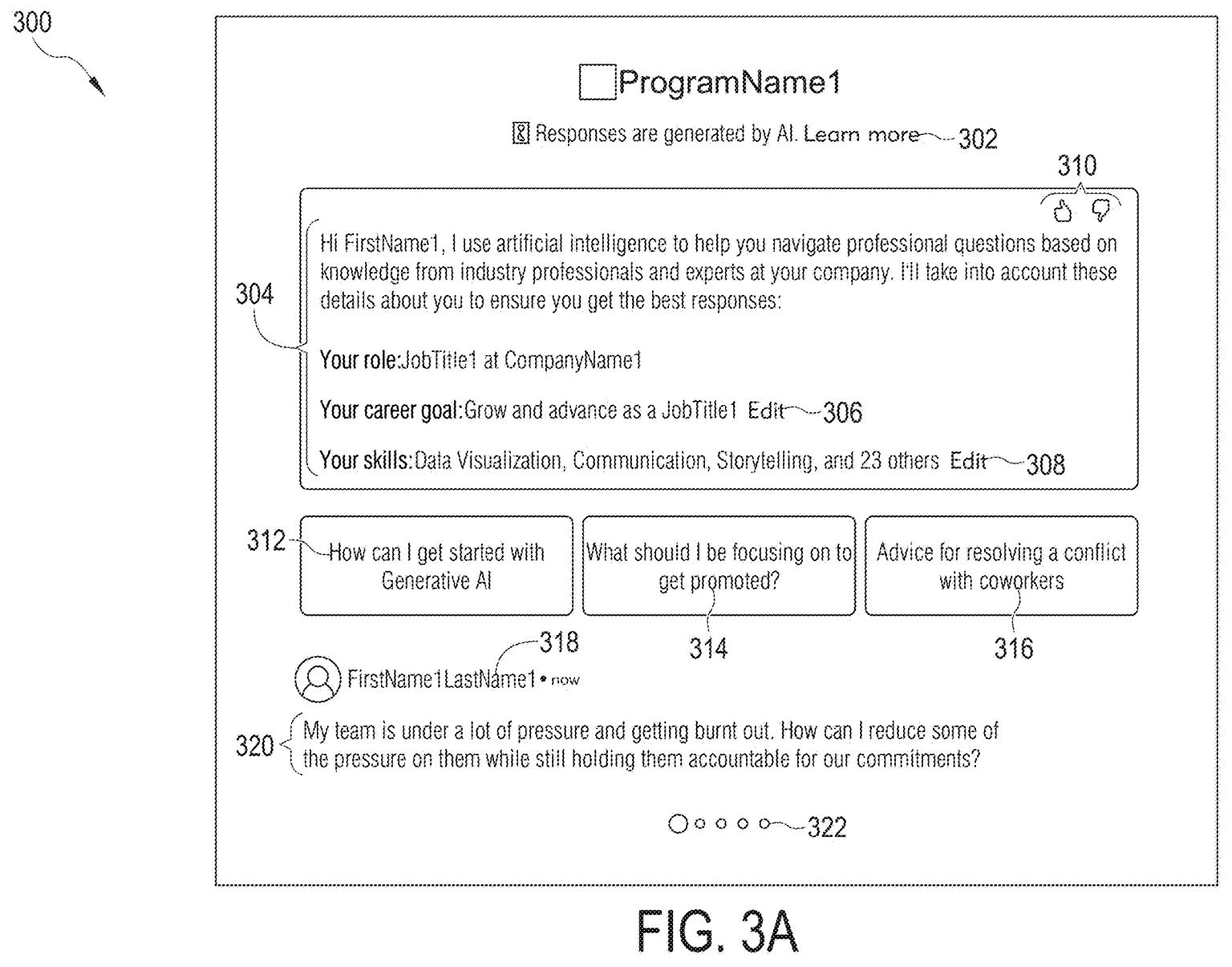

In FIG. 3A, a user interface 300 displays an app title, ProgramName1 (e.g., Learning Coach software) and a notification 302 informing the user that the app's responses are generated by AI. A dialog box displays a system-generated dialog portion 304 and a feedback input mechanism 310. The system-generated portion 304 is machine-generated using portions of the technologies described herein. For example, the system has retrieved the user's current role, career goal, and skills from, e.g., the user's online profile, for instance as dialog context data, and included this dialog context data in the system-generated dialog portion 304.

The feedback input mechanism 310 enables the user to give feedback on the system-generated dialog portion 304. For example, the user can select a thumbs-up icon to indicate that the system-generated dialog portion 304 is appropriate and relevant, or the user can select a thumbs-down icon to indicate that the system-generated dialog portion 304 is not appropriate or not relevant. The user input received by the system via the feedback input mechanism 310 can be used to improve the prompt engineering and/or to tune one or more of the generative models used to generate the system-generated dialog portion 304.

The user interface 300 also includes user-selectable control mechanisms 312, 314, and 316, and a chat-style input section below the user-selectable control mechanisms 312, 314, and 316. In the example of FIG. 3A, the user identified by, e.g., identifier data 318, has responded to the system-generated dialog portion 304 by inputting a portion of dialog input 320 in the chat-style input section. In response to the user's dialog input 320, the system has initiated a large language model-based process of generating a response to the dialog input 320. A "work in progress" indicator 322 indicates that the system is working on generating a response.

Figure 3B:
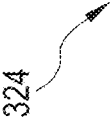

In FIG. 3B, user interface 324 displays the user identifier data 318 as identifier data 326, and displays a vertically-oriented chat-style dialog in which the user's dialog input 320 is now displayed at the top of the screen as user dialog input 328. User interface 324 also displays, in response to the user's dialog input 328, another system-generated dialog portion, which has been generated using portions of the technologies described herein including, for example, one or more large language models. The system-generated dialog portion of user interface 324 includes natural language portion 330 and structured element portion 342. Natural language portion 330 includes machine-generated natural language text including embedded hyperlinks to recommended online content items and user profiles. For example, the natural language portion 330 includes hyperlinks to online courses 332, 340, an article 338, and hyperlinks to profile pages of the associated course instructors and/or authors 334, 336. The hyperlinks are generated based on dialog context data obtained by, for example, traversing one or more entity graphs and/or querying one or more data stores of one or more online systems. Structured element portion 342 includes user-selectable mechanisms that include links to information, e.g., profile pages of the persons mentioned in the natural language portion 330.

User interface 324 also includes a notification regarding the use of AI to generate content, a chat-style message input box 344, and a send mechanism 348. The message input box 344 enables the user to input another dialog portion in response to the system-generated dialog portion 330, 342. The send mechanism 348 when selected by the user causes input entered in to the input box 344 to be processed by the system and stored in the dialog history.

In FIG. 3C, user interface 350 displays the previously-entered and generated portions of the online dialog and also displays natural language input 352 entered by the user into message input box 344. Natural language input as used herein may refer to unstructured natural language text as opposed to structured input such as selections of pre-defined user interface input mechanisms. The user's natural language input 352 mentioned the name of one of the recommended instructors, FirstName3, which corresponds to the selectable mechanism 354. For example, the user may have clicked on selectable mechanism 354 to view the profile page for FirstName3 and then entered the natural language input 352 specifically referencing FirstName3 based on the instructor's profile page.

In FIG. 3D, user interface 358 displays the previous rounds of dialog including the natural language input 352. In response to natural language input 352, user interface 358 displays another system-generated dialog portion 360, which has been generated using portions of the technologies described herein, including, for example, one or more large language models. For example, the system has used the search system to query and retrieve information from the FirstName3 instructor's home page, and has incorporated the retrieved information into the system-generated dialog portion 360. User interface 358 also displays another round of dialog input 364 entered by the user in response to the system-generated dialog portion 360.

In FIG. 3E, user interface 359 displays previous rounds of dialog including the user's dialog input portion 352, the system-generated dialog portion 360 generated in response to the dialog input portion 352, the user's dialog input portion 364 input in response to the system-generated dialog portion 360, and a new set of system-generated dialog portions 366, 368, 370, 372, 374, 376, 378, which has been generated using portions of the technologies described herein, in response to the user's dialog input portion 364 and the prior dialog history.

System-generated dialog portions 366, 368, 370, 372, 374, 376, 378 include natural language text 366, user-selectable mechanisms 368, 370, natural language text 372 including embedded hyperlinks, and user-selectable entity mechanisms 374 including a user connection mechanism 376 by which the user can send a connection request to the user identified by the identifier 376, and a content item selection mechanism by which the user can link to an online course associated with the identifier 378. As shown, FIG. 3E illustrates how aspects of the generative summarization dialog-based information retrieval system can use one or more generative language models in coordination with a search system to obtain and organize multiple different types of related information (e.g., text, hyperlinks, user interface selection mechanisms, etc.) into a coherent and relevant but also concise response to a relatively unspecific user request (e.g., "how should I go about this?").

The examples shown in FIG. 3A, FIG. 3B, FIG. 3C, FIG. 3D, and FIG. 3E, and the accompanying description, above, are provided for illustration purposes. For example, while the examples are illustrated as user interface screens for a smaller form factor such as smart phones, tablet computers, and wearable devices, the user interfaces can be configured for other forms of electronic devices, such as desktop computers and/or laptop devices. This disclosure is not limited to the described examples. Additional or alternative details and implementations are described herein.

Figure 4A:
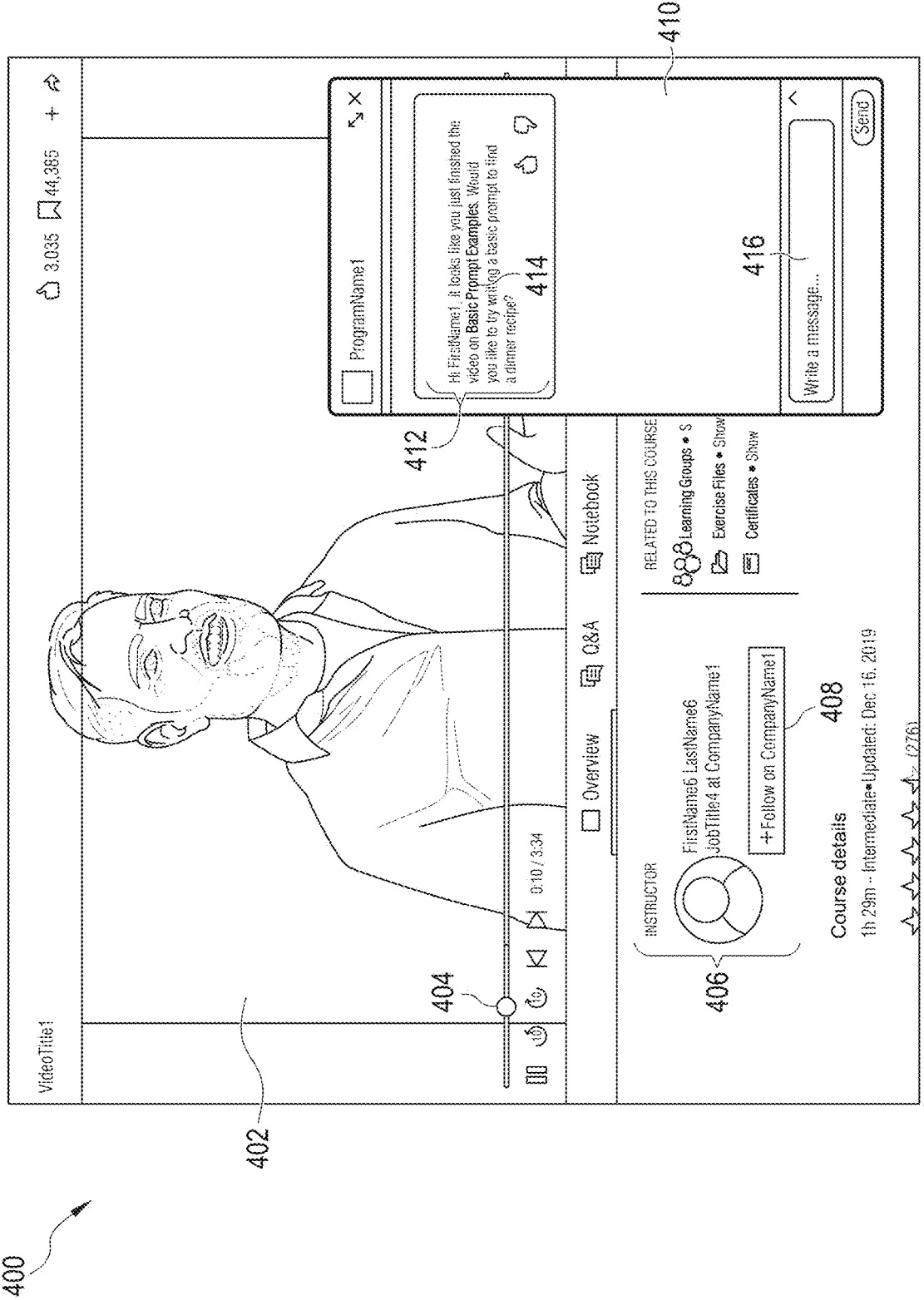
Figure 4B:
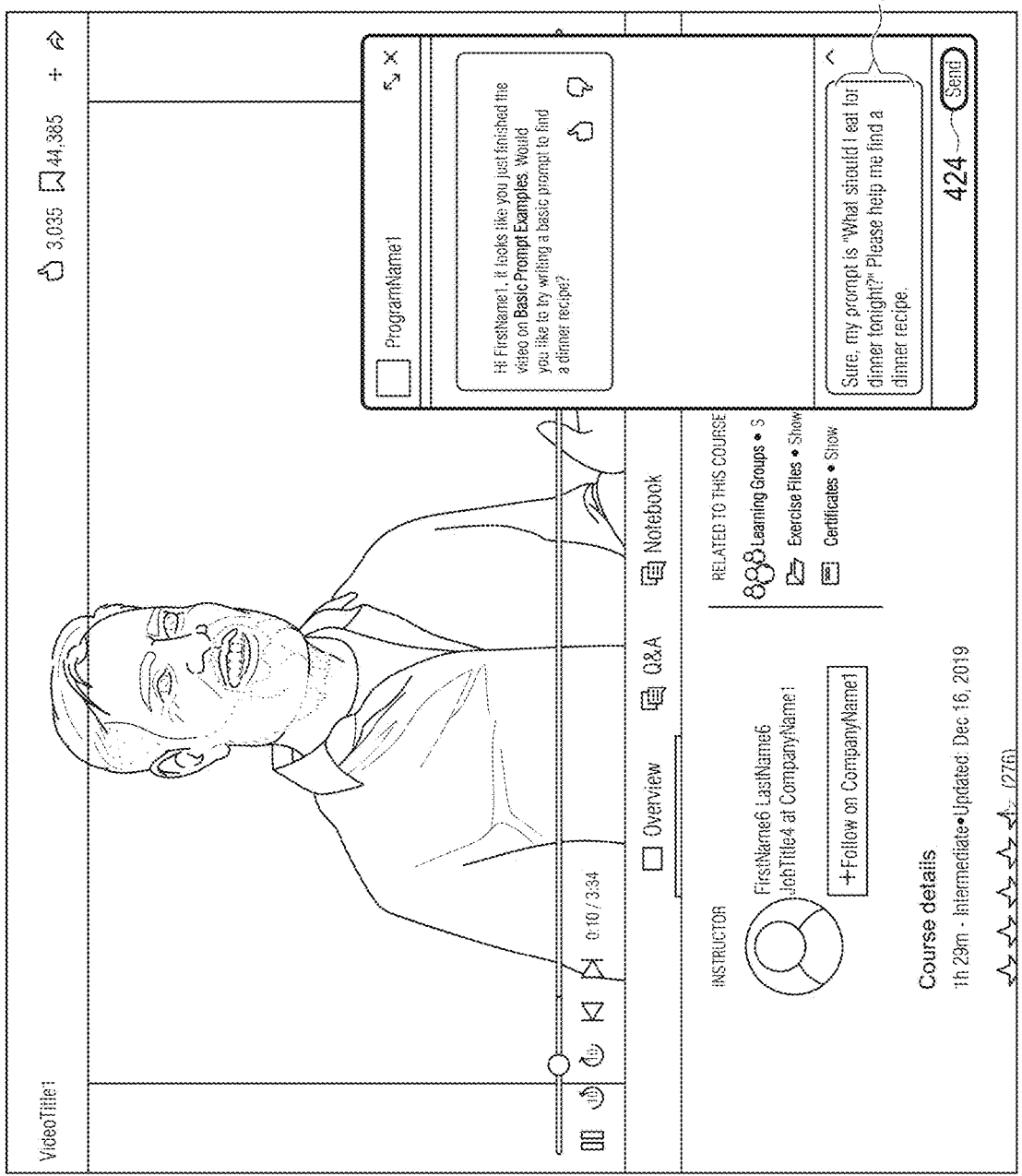
Figure 4C:
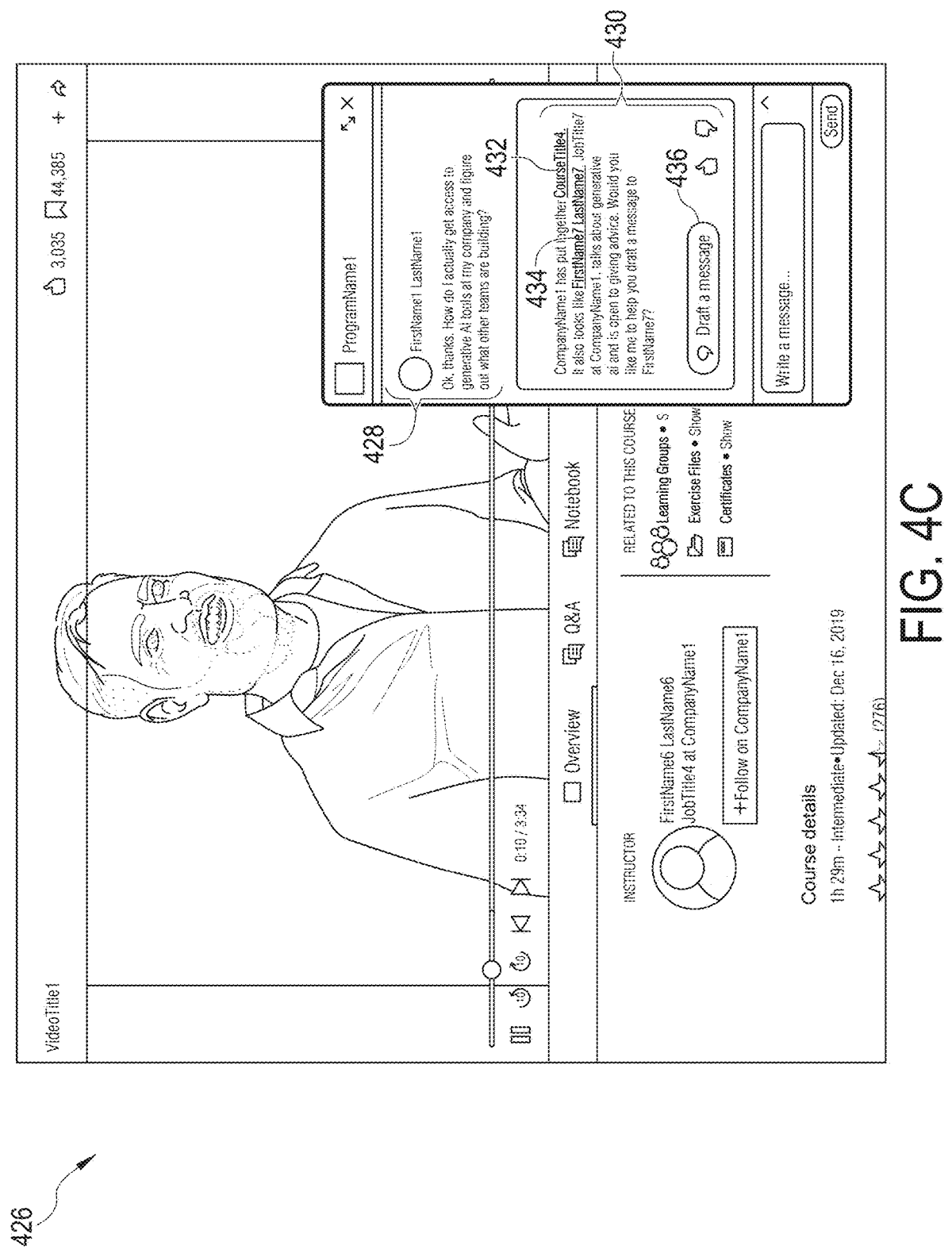

FIG. 4A, FIG. 4B, and FIG. 4C illustrate an example of at least one flow including screen captures of user interface screens configured to provide generative summarization dialog-based information retrieval in accordance with some embodiments of the present disclosure.

The figures FIG. 4A, FIG. 4B, and FIG. 4C illustrate a user interface flow or sequence of user interface views that can be presented to a user in the context of another application such as an online learning application. For example, the disclosed technologies can be integrated with or linked to other applications so that the user can seamlessly switch contexts from, for example, watching a video in an online learning application to working with an automated learning coach software via an online dialog to obtain more information about the video or related information.

In the user interfaces shown in FIG. 4A, FIG. 4B, and FIG. 4C, certain data that would normally be displayed may be anonymized for the purpose of this disclosure. In a live example, the actual data and not the anonymized version would be displayed. For example, the text "JobTitle" would be replaced with an actual job title (e.g., software engineer) and "FirstName LastName" would be replaced with a user's actual name. The user interfaces shown in FIG. 4A, FIG. 4B, and FIG. 4C are presented by an application software system, such as information retrieval system, to a user who wants to use their computing device to obtain assistance with a task. In some implementations, the user interfaces are each implemented as a web page that is stored, e.g., at a server or in a cache of a user device, and then loaded into a display of a user device via the user device sending a page load request to the server. The icons and the selection and arrangement of elements shown in the user interfaces are copyright 2023. LinkedIn Corporation, all rights reserved.

The graphical user interface control elements (e.g., fields, boxes, buttons, etc.) shown in the screen captures are implemented via software used to construct the user interface screens. While the screen captures illustrate examples of user interface screens, e.g., visual displays such as digital, e.g., online forms or web pages, this disclosure is not limited to online forms or web page implementations, visual displays, or graphical user interfaces. In other implementations, for instance, an automated chatbot is used in place of a fill-in form, where the chatbot requests the user to input the requested information via a conversational, natural language dialog or message-based format using text and/or spoken-language audio received via a microphone embedded in a computing device.

FIG. 4A illustrates an example of a screen capture of a user interface 400 that includes a media player. The user interface 400 includes a video playback display window 402, an elapsed time indicator 404, and assorted playback controls. The user interface 400 also displays information obtained from a social network service, such as a link 406 to the profile page of the instructor of the video being played in the playback window 402 and a follow mechanism 408 by which the user can request to follow the instructor in the social network service. The user interface 400 also includes an online dialog 410. In the example of FIG. 4A, the online dialog 410 includes system-generated dialog portion 412 including a hyperlink 414 to related course materials, and a message input box 416 by which the user can input a response to the system-generated dialog portion 412. System-generated dialog portion 412 is generated using the disclosed technologies including, for example, one or more large language models and a search system that has retrieved supplemental information to recommend to the user based on the user's activity of watching the video displayed in the playback window 402.

FIG. 4B illustrates an example of a screen capture of a user interface 420 that is an updated version of the user interface 400. For example, user interface 420 includes the components of user interface 400, an input dialog portion 422, and a send mechanism 424. Input dialog portion 422 has been input by the user who has also viewed the video shown in playback window 402.

FIG. 4C illustrates an example of a screen capture of a user interface 426 that is an updated version of the user interface 420. For example, user interface 426 includes the components of user interface 420 but with subsequent dialog portions 428, 430. Dialog portion 428 is an input dialog portion entered by the user. Dialog portion 430 is a system-generated dialog portion generated using the disclosed technologies including one or more generative models and a search system. Dialog portion 430 includes a concise representation of multiple different types of data retrieved by the search system, including hyperlinks 432 to course title and author information and a user-selectable mechanism 436 by which the user can obtain a system-generated first draft of a message.

The examples shown in FIG. 4A, FIG. 4B, and FIG. 4C, and the accompanying description, above, are provided for illustration purposes. For example, while the examples are illustrated as user interface screens for a larger form factor such as desktop computers and/or laptop devices, the user interfaces can be configured for other forms of electronic devices, such as smart phones, tablet computers, and wearable devices. This disclosure is not limited to the described examples. Additional or alternative details and implementations are described herein.

FIG. 5 is a block diagram of a computing system that includes a generative summarization dialog-based information retrieval system in accordance with some embodiments of the present disclosure.

In the embodiment of FIG. 5, a computing system 500 includes one or more user systems 510, a network 520, an application software system 530, a generative summarization dialog-based information retrieval system 580, a data storage system 550, and an event logging service 570. Components of the computing system 500 including the generative summarization dialog-based information retrieval system 580 are described in more detail herein.

A user system 510 includes at least one computing device, such as a personal computing device, a server, a mobile computing device, a wearable electronic device, or a smart appliance, and at least one software application that the at least one computing device is capable of executing, such as an operating system or a front end of an online system. Many different user systems 510 can be connected to network 520 at the same time or at different times. Different user systems 510 can contain similar components as described in connection with the illustrated user system 510. For example, many different end users of computing system 500 can be interacting with many different instances of application software system 530 through their respective user systems 510, at the same time or at different times.

User system 510 includes a user interface 512. User interface 512 is installed on or accessible to user system 510 by network 520. Embodiments of user interface 512 include a dialog-based information retrieval interface 514. Dialog-based information retrieval interface 514 enables user interaction with the generative summarization dialog-based information retrieval system 580 and/or application software system 530, including the creation and continuance of online dialogs. For example, dialog-based information retrieval interface 514 provides user input mechanisms by which the generative summarization dialog-based information retrieval system 580 receives user-generated dialog input, and provides output mechanisms by which the generative summarization dialog-based information retrieval system 580 electronically communicates system-generated dialog output to the user.

Dialog-based information retrieval interface 514 includes, for example, a graphical display screen that includes graphical user interface elements such as at least one input box or other input mechanism and at least one slot. A slot as used herein refers to a space on a graphical display such as a web page or mobile device screen, into which digital content such as dialog portions and search results can be loaded for display to the user. For example, dialog-based information retrieval interface 514 may be configured with a scrollable arrangement of variable-length slots that simulates an online chat or instant messaging session. The locations and dimensions of a particular graphical user interface element on a screen are specified using, for example, a markup language such as HTML (Hypertext Markup Language). On a typical display screen, a graphical user interface element is defined by two-dimensional coordinates. In other implementations such as virtual reality or augmented reality implementations, a slot may be defined using a three-dimensional coordinate system. Examples of user interface screens that can be included in dialog-based information retrieval interface 514 are shown in the screen capture figures shown in the drawings and described herein.

User interface 512 can be used to create, edit, send, view, receive, process, and organize portions of online dialogs including system-generated responses that include search results. In some implementations, user interface 512 enables the user to upload, download, receive, send, or share of other types of digital content items, including posts, articles, comments, and shares, to initiate user interface events, and to view or otherwise perceive output such as data and/or digital content produced by application software system 530, generative summarization dialog-based information retrieval system 580, and/or content distribution service 538. For example, user interface 512 can include a graphical user interface (GUI), a conversational voice/speech interface, a virtual reality, augmented reality, or mixed reality interface, and/or a haptic interface. User interface 512 includes a mechanism for logging in to application software system 530, clicking or tapping on GUI user input control elements, and interacting with dialog-based information retrieval interface 514 and digital content items such as online dialogs and machine-generated dialog portions. Examples of user interface 512 include web browsers, command line interfaces, and mobile app front ends. User interface 512 as used herein can include application programming interfaces (APIs).

In the example of FIG. 5, user interface 512 includes dialog-based information retrieval interface 514. Dialog-based information retrieval interface 514 includes a front end user interface component of generative summarization dialog-based information retrieval system 580, application software system 530, or a messaging component of application software system 530. For example, dialog-based information retrieval interface 514 can be directly integrated with other components of any user interface of application software system 530 rather than as a separate chatbot or other type of chat feature. Dialog-based information retrieval interface 514 is shown as a component of user interface 512 for ease of discussion, but access to dialog-based information retrieval interface 514 can be limited to specific user systems 510. For example, in some implementations, access to dialog-based information retrieval interface 514 is limited to registered users of generative summarization dialog-based information retrieval system 580 or application software system 530.

All or at least some components of generative summarization dialog-based information retrieval system 580 are implemented at the user system 510, in some implementations. For example, either or both of dialog-based information retrieval interface 514 and generative summarization dialog-based information retrieval system 580 are implemented directly upon a single client device such that communications between dialog-based information retrieval interface 514 and generative summarization dialog-based information retrieval system 580 occur on-device without the need to communicate with, e.g., one or more servers, over the Internet. Dashed lines are used in FIG. 5 to indicate that all or portions of generative summarization dialog-based information retrieval system 580 can be implemented directly on the user system 510, e.g., the user's client device. In other words, both user system 510 and generative summarization dialog-based information retrieval system 580 can be implemented on the same computing device.

Network 520 includes an electronic communications network. Network 520 can be implemented on any medium or mechanism that provides for the exchange of digital data, signals, and/or instructions between the various components of computing system 500. Examples of network 520 include, without limitation, a Local Area Network (LAN), a Wide Area Network (WAN), an Ethernet network or the Internet, or at least one terrestrial, satellite or wireless link, or a combination of any number of different networks and/or communication links.

Application software system 530 includes any type of application software system that provides or enables the creation, upload, and/or distribution of at least one form of digital content, including machine-generated dialog portions, between or among user systems, such as user system 510, via user interface 512. In some implementations, portions of generative summarization dialog-based information retrieval system 580 are components of application software system 530. Components of application software system 530 can include an entity graph 532 and/or knowledge graph 534, a user connection network 536, a content distribution service 538, and a search engine 540.

In the example of FIG. 5, application software system 530 includes an entity graph 532 and/or a knowledge graph 534. Entity graph 532 and/or knowledge graph 534 include data organized according to graph-based data structures that can be traversed via queries and/or indexes to determine relationships between entities. An example of an entity graph is shown in FIG. 6, described herein. For instance, as described in more detail with reference to FIG. 6, entity graph 532 and/or knowledge graph 534 can be used to compute various types of relationship weights, affinity scores, similarity measurements, and/or statistics between, among, or relating to entities.

Entity graph 532, 534 includes a graph-based representation of data stored in data storage system 550, described herein. For example, entity graph 532, 534 represents entities, such as users, organizations (e.g., companies, schools, institutions), and content items (e.g., job postings, announcements, articles, comments, and shares, as nodes of a graph. Entity graph 532, 534 represents relationships, also referred to as mappings or links, between or among entities as edges, or combinations of edges, between the nodes of the graph. In some implementations, mappings between different pieces of data used by application software system 530 are represented by one or more entity graphs. In some implementations, the edges, mappings, or links indicate online interactions or activities relating to the entities connected by the edges, mappings, or links. For example, if a user views a learning video, an edge may be created connecting the user entity with the content item entity that represents the learning video in the entity graph, where the edge may be tagged with a label such as "viewed."

Portions of entity graph 532, 534 can be automatically re-generated or updated from time to time based on changes and updates to the stored data, e.g., updates to entity data and/or activity data. Also, entity graph 532, 534 can refer to an entire system-wide entity graph or to only a portion of a system-wide graph. For instance, entity graph 532, 534 can refer to a subset of a system-wide graph, where the subset pertains to a particular user or group of users of application software system 530.

In some implementations, knowledge graph 534 is a subset or a superset of entity graph 532. For example, in some implementations, knowledge graph 534 includes multiple different entity graphs 532 that are joined by cross-application or cross-domain edges. For instance, knowledge graph 534 can join entity graphs 532 that have been created across multiple different databases or across different software products. In some implementations, the entity nodes of the knowledge graph 534 represent concepts, such as product surfaces, verticals, or application domains. In some implementations, knowledge graph 534 includes a platform that extracts and stores different concepts that can be used to establish links between data across multiple different software applications. Examples of concepts include topics, industries, and skills. The knowledge graph 534 can be used to generate and export content and entity-level embeddings that can be used to discover or infer new interrelationships between entities and/or concepts, which then can be used to identify related entities. As with other portions of entity graph 532, knowledge graph 534 can be used to compute various types of relationship weights, affinity scores, similarity measurements, and/or statistical correlations between or among entities and/or concepts.

Knowledge graph 534 includes a graph-based representation of data stored in data storage system 550, described herein. Knowledge graph 534 represents relationships, also referred to as links or mappings, between entities or concepts as edges, or combinations of edges, between the nodes of the graph. In some implementations, mappings between different pieces of data used by application software system 530 or across multiple different application software systems are represented by the knowledge graph 534.

User connection network 536 includes, for instance, a social network service, professional social network software and/or other social graph-based applications. Content distribution service 538 includes, for example, a chatbot or chat-style system, a messaging system, such as a peer-to-peer messaging system that enables the creation and exchange of messages among users of application software system 530, or a news feed. Search engine 540 includes a search engine that enables users of application software system 530 to input and execute search queries on user connection network 536 and/or entity graph 532 and/or knowledge graph 534. In some implementations, one or more portions of dialog-based information retrieval interface 514 and/or generative summarization dialog-based information retrieval system 580 are in bidirectional communication with search engine 540. Application software system 530 can include, for example, online systems that provide social network services, general-purpose search engines, specific-purpose search engines, messaging systems, content distribution platforms, e-commerce software, enterprise software, or any combination of any of the foregoing or other types of software.

In some implementations, a front end portion of application software system 530 can operate in user system 510, for example as a plugin or widget in a graphical user interface of a web application, mobile software application, or as a web browser executing user interface 512. In an embodiment, a mobile app or a web browser of a user system 510 can transmit a network communication such as an HTTP request over network 520 in response to user input that is received through a user interface provided by the web application, mobile app, or web browser, such as user interface 512. A server running application software system 530 can receive the input from the web application, mobile app, or browser executing user interface 512, perform at least one operation using the input, and return output to the user interface 512 using a network communication such as an HTTP response, which the web application, mobile app, or browser receives and processes at the user system 510.

In the example of FIG. 5, application software system 530 includes a content distribution service 538. The content distribution service 538 can include a data storage service, such as a web server, which stores digital content items, and transmits digital content items to users within online dialogs operated by generative summarization dialog-based information retrieval system 580. Alternatively or in addition, the generative summarization dialog-based information retrieval system 580 can interface with one or more components or services of content distribution service 538, such as one or more recommendation models (e.g., ranking systems, content you may be interested in, people you may know, etc.) to obtain information that can be included in system-generated portions of online dialogs operated by generative summarization dialog-based information retrieval system 580.

In some embodiments, content distribution service 538 processes requests from, for example, application software system 530 and/or generative summarization dialog-based information retrieval system 580, and distributes digital content items to user systems 510 in response to requests, based on output of the recommendation models or ranking models. A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click on a graphical user interface element, or a page load. In some implementations, content distribution service 538 is part of application software system 530 or generative summarization dialog-based information retrieval system 580. In other implementations, content distribution service 538 interfaces with application software system 530 and/or generative summarization dialog-based information retrieval system 580, for example, via one or more application programming interfaces (APIs).

In the example of FIG. 5, application software system 530 includes a search engine 540. Search engine 540 is a software system designed to search for and retrieve information by executing queries on data stores, such as databases, connection networks, and/or graphs. The queries are designed to find information that matches specified criteria, such as keywords and phrases. For example, search engine 540 is used to retrieve data by executing queries on various indexes or data stores of data storage system 550, or by traversing entity graph 532, 534, or by communicating with a recommendation system or ranking model.

The generative summarization dialog-based information retrieval system 580 operates online dialogs with users of application software system 530 and/or generative summarization dialog-based information retrieval system 580 using one or more generative models, such as large language models, based on input received via dialog-based information retrieval interface 514 and/or other data sources. In some implementations, generative summarization dialog-based information retrieval system 580 generates search prompts, search queries, response prompts, and dialog responses. Additional or alternative features and functionality of generative summarization dialog-based information retrieval systems described herein, such as generative summarization dialog-based information retrieval system 102, or generative summarization dialog-based information retrieval system 100, are included in generative summarization dialog-based information retrieval system 580 in various embodiments.

Event logging service 570 captures and records network activity data generated during operation of application software system 530 and/or generative summarization dialog-based information retrieval system 580, including user interface events generated at user systems 510 via user interface 512, in real time, and formulates the user interface events into a data stream that can be consumed by, for example, a stream processing system. Examples of network activity data include dialog inputs, dialog views, page loads, clicks on messages or graphical user interface control elements, the creation, editing, sending, and viewing of messages, and social action data such as likes, shares, comments, and social reactions (e.g., "insightful," "curious," etc.). For instance, when a user of application software system 530 via a user system 510 starts an online dialog or clicks on a user interface element, such as a message, a link, or a user interface control element such as a view, comment, share, or reaction button, or uploads a file, or creates a message, loads a web page, or scrolls through a feed, etc., event logging service 570 fires an event to capture an identifier, such as a session identifier, an event type, a date/timestamp at which the user interface event occurred, and possibly other information about the user interface event, such as the impression portal and the impression channel involved in the user interface event. Examples of impression portals and channels include, for example, device types, operating systems, and software platforms, e.g., web or mobile.

For instance, when a user creates a dialog portion via generative summarization dialog-based information retrieval system 580, or reacts to a system-generated dialog portion received from generative summarization dialog-based information retrieval system 580, event logging service 570 stores the corresponding event data in a log. Event logging service 570 generates a data stream that includes a record of real-time event data for each user interface event that has occurred. Event data logged by event logging service 570 can be pre-processed and anonymized as needed so that it can be used, for example, to generate relationship weights, affinity scores, similarity measurements, and/or to formulate training data for artificial intelligence models.

Data storage system 550 includes data stores and/or data services that store digital data received, used, manipulated, and produced by application software system 530 and/or generative summarization dialog-based information retrieval system 580, including search prompts, response prompts, dialog portions, dialog metadata, attribute data, activity data, machine learning model training data, machine learning model parameters, and machine learning model inputs and outputs, such as machine-generated classifications and machine-generated score data.

In the example of FIG. 5, data storage system 550 includes an entity data store 552, an activity data store 554, a prompt data store 556, a dialog data store 558, and a large language model (LLM) data store 560. Entity data store 552 stores data relating to users, content items, and other entities, such as profile data, which are used by the generative summarization dialog-based information retrieval system 580 to, for example, generate prompts, generate dialog portions, and/or compute weights, statistics, similarity measurements, or scores. Activity data store 554 stores data relating to network activity, e.g., user interface event data extracted from application software system 530, dialog-based information retrieval interface 514, and/or generative summarization dialog-based information retrieval system 580 by event logging service 570, which are used by the generative summarization dialog-based information retrieval system 580 to, for example, generate prompts, generate dialog portions, and/or compute weights, statistics, similarity measurements, or scores.

Prompt data store 556 stores prompt templates and/or prompts generated and output by one or more components of generative summarization dialog-based information retrieval system 580, including search prompts and response prompts. Dialog data store 558 stores online dialogs and/or dialog portions, including machine-generated dialog portions generated by one or more large language models of generative summarization dialog-based information retrieval system 580, related metadata, and related data, such as dialog context data obtained from one or more contextual resources. LLM data store 560 stores data that can be used to configure, train or tune one or more large language models of the generative summarization dialog-based information retrieval system 580. While referred to as LLM data store 560, the data store 560 can be used to store data associated with other types of generative models when those other types of generative models are used by the generative summarization dialog-based information retrieval system 580.

In some embodiments, data storage system 550 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine. Data stores of data storage system 550 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 550 resides on at least one persistent and/or volatile storage device that can reside within the same local network as at least one other device of computing system 500 and/or in a network that is remote relative to at least one other device of computing system 500. Thus, although depicted as being included in computing system 500, portions of data storage system 550 can be part of computing system 500 or accessed by computing system 500 over a network, such as network 520.

While not specifically shown, it should be understood that any of user system 510, application software system 530, generative summarization dialog-based information retrieval system 580, data storage system 550, and event logging service 570 includes an interface embodied as computer programming code stored in computer memory that when executed causes a computing device to enable bidirectional communication with any other of user system 510, application software system 530, generative summarization dialog-based information retrieval system 580, data storage system 550, or event logging service 570 using a communicative coupling mechanism. Examples of communicative coupling mechanisms include network interfaces, inter-process communication (IPC) interfaces and application program interfaces (APIs).

Each of user system 510, application software system 530, generative summarization dialog-based information retrieval system 580, data storage system 550, and event logging service 570 is implemented using at least one computing device that is communicatively coupled to electronic communications network 520. Any of user system 510, application software system 530, generative summarization dialog-based information retrieval system 580, data storage system 550, and event logging service 570 can be bidirectionally communicatively coupled by network 520.

User system 510 as well as other different user systems (not shown) can be bidirectionally communicatively coupled to application software system 530 and/or generative summarization dialog-based information retrieval system 580.

A typical user of user system 510 can be an administrator or end user of application software system 530 or generative summarization dialog-based information retrieval system 580. User system 510 is configured to communicate bidirectionally with any of application software system 530, generative summarization dialog-based information retrieval system 580, data storage system 550, and event logging service 570 over network 520.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 510, application software system 530, generative summarization dialog-based information retrieval system 580, data storage system 550, and event logging service 570 are implemented using computer software, hardware, or software and hardware, and can include combinations of automated functionality, data structures, and digital data, which are represented schematically in the figures. User system 510, application software system 530, generative summarization dialog-based information retrieval system 580, data storage system 550, and event logging service 570 are shown as separate elements in FIG. 5 for ease of discussion but, except as otherwise described, the illustration is not meant to imply that separation of these elements is required. The illustrated systems, services, and data stores (or their functionality) of each of user system 510, application software system 530, generative summarization dialog-based information retrieval system 580, data storage system 550, and event logging service 570 can be divided over any number of physical systems, including a single physical computer system, and can communicate with each other in any appropriate manner.

Figure 8:
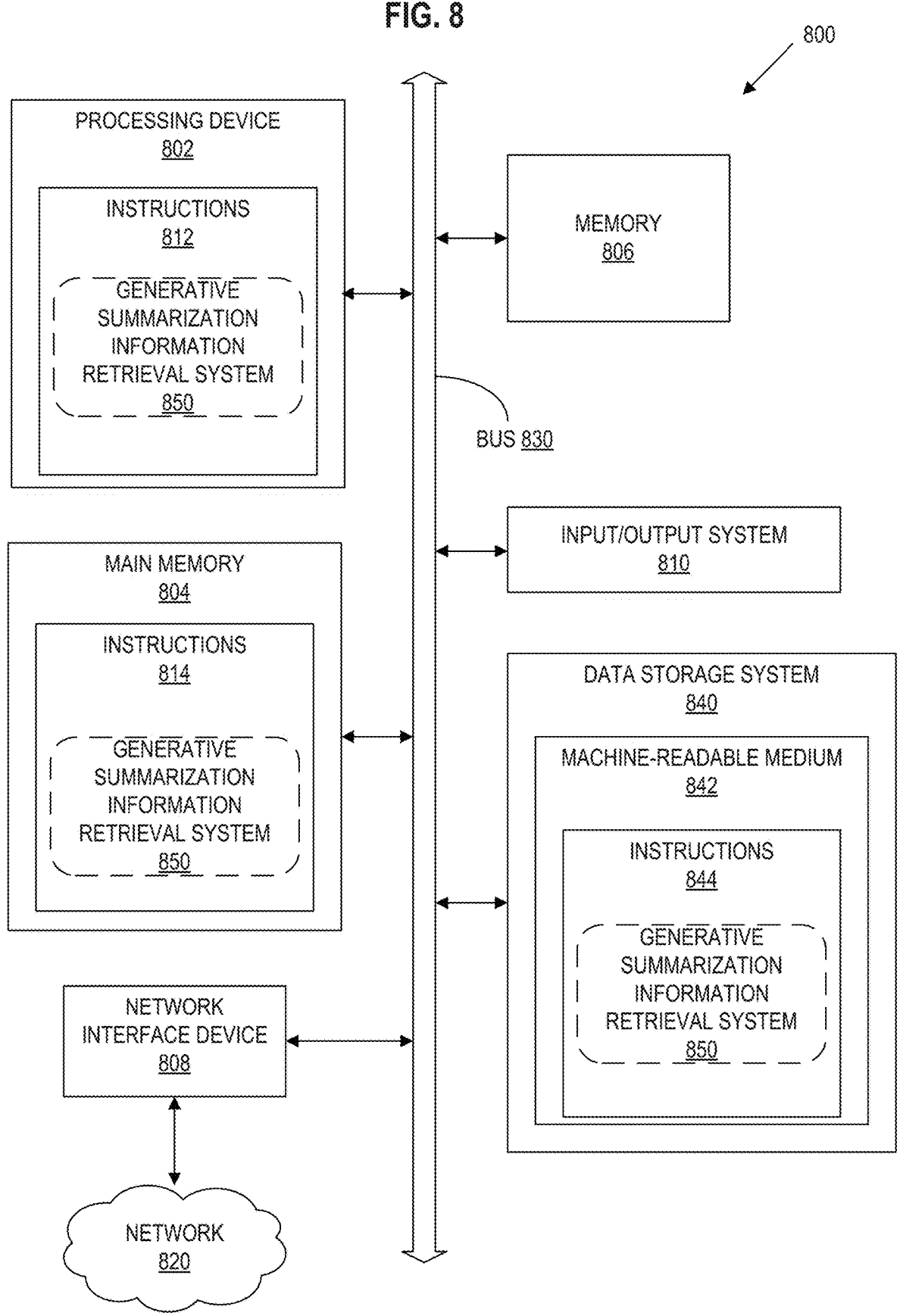
FIG. 8 is a block diagram of an example computer system including components of a generative summarization dialog-based information retrieval system in accordance with some embodiments of the present disclosure.

In the embodiment of FIG. 8, portions of dialog-based information retrieval interface 514 and generative summarization dialog-based information retrieval system 580 are collectively represented as generative summarization dialog-based information retrieval system 850 for ease of discussion only. Dialog-based information retrieval interface 514 and generative summarization dialog-based information retrieval system 580 are not required to be implemented all on the same computing device, in the same memory, or loaded into the same memory at the same time. For example, access to dialog-based information retrieval interface 514 and/or generative summarization dialog-based information retrieval system 580 can be limited to different, mutually exclusive sets of user systems and/or servers. For instance, in some implementations, a separate, personalized version of generative summarization dialog-based information retrieval system 580 is created for each user of the generative summarization dialog-based information retrieval system 580 such that data is not shared between or among the separate, personalized versions of the system 580. Additionally, dialog-based information retrieval interface 514 typically may be implemented on user systems while generative summarization dialog-based information retrieval system 580 typically may be implemented on a server computer or group of servers. In some embodiments, however, one or more portions of generative summarization dialog-based information retrieval system 580 are implemented on user systems. For example, both dialog-based information retrieval interface 514 and generative summarization dialog-based information retrieval system 580 are implemented on user systems, e.g., client devices, in some implementations. Further details with regard to the operations of generative summarization dialog-based information retrieval system 850 are described herein.

FIG. 6 is an example of an entity graph in accordance with some embodiments of the present disclosure.

The entity graph 600 can be used by an application software system, e.g., a social network service, to support a user connection network, in accordance with some embodiments of the present disclosure. The entity graph 600 can be used (e.g., queried or traversed) to obtain or generate dialog context data that can be used to formulate model input, such as a search prompt or a response prompt, for a generative model, such as a large language model of a generative summarization dialog-based information retrieval system.

The entity graph 600 includes nodes, edges, and data (such as labels, weights, or scores) associated with nodes and/or edges. Nodes can be weighted based on, for example, similarity with other nodes, edge counts, or other types of computations, and edges can be weighted based on, for example, affinities, relationships, activities, similarities, or commonalities between the nodes connected by the edges, such as common attribute values (e.g., two users have the same job title or employer, or two users are n-degree connections in a user connection network, where n is a positive integer).

A graphing mechanism is used to create, update and maintain the entity graph. In some implementations, the graphing mechanism is a component of the database architecture used to implement the entity graph 600. For instance, the graphing mechanism can be a component of data storage system 550 and/or application software system 530, shown in FIG. 5, and the entity graphs created by the graphing mechanism can be stored in one or more data stores of data storage system 550.

The entity graph 600 is dynamic (e.g., continuously updated) in that it is updated in response to occurrences of interactions between entities in an online system (e.g., a user connection network) and/or computations of new relationships between or among nodes of the graph. These updates are accomplished by real-time data ingestion and storage technologies, or by offline data extraction, computation, and storage technologies, or a combination of real-time and offline technologies. For example, the entity graph 600 is updated in response to updates of user profiles, the creation or deletion of user connections with other users, and the creation and distribution of new content items, such as messages, posts, articles, comments, and shares. As another example, the entity graph 600 is updated as new computations are computed, for example, as new relationships between nodes are created based on statistical correlations or machine learning model output.

In some implementations, the entity graph 600 includes a knowledge graph that contains cross-application links. For example, dialog context data obtained from one or more contextual resources can be linked with entities and/or edges of the entity graph.

In the example of FIG. 6, entity graph 600 includes entity nodes, which represent entities, such as content item nodes (e.g., Post U21, Article 1, Learning Video 1), user nodes (e.g., User 1, User 2, User 3, User 4), and job nodes (e.g., Job 1, Job 2). Entity graph 600 also includes attribute nodes, which represent attributes (e.g., job title data, article title data, skill data, topic data) of entities. Examples of attribute nodes include title nodes (e.g., Title U1, Title A1), company nodes (e.g., Company 1), topic nodes (Topic 1, Topic 2), and skill nodes (e.g., Skill A1, Skill U11, Skill U31, Skill U41).

Entity graph 600 also includes edges. The edges individually and/or collectively represent various different types of relationships between or among the nodes. Data can be linked with both nodes and edges. For example, when stored in a data store, each node is assigned a unique node identifier and each edge is assigned a unique edge identifier. The edge identifier can be, for example, a combination of the node identifiers of the nodes connected by the edge and a timestamp that indicates the date and time at which the edge was created. For instance, in the graph 600, edges between user nodes can represent online social connections between the users represented by the nodes, such as 'friend' or 'follower' connections between the connected nodes. As an example, in the entity graph 600, User 3 is a first-degree connection of User 1 by virtue of the CONNECTED edge between the User 3 node and the User 1 node, while User 2 is a second-degree connection of User 3, although User 1 has a different type of connection, FOLLOWS, with User 2 than with User 3.

In the entity graph 600, edges can represent activities involving the entities represented by the nodes connected by the edges. For example, a POSTED edge between the User 2 node and the Post U21 node indicates that the user represented by the User 2 node posted the digital content item represented by the PostU21 node to the application software system (e.g., as educational content posted to a user connection network). As another example, a SHARED edge between the User 1 node and the Post U21 node indicates that the user represented by the User 1 node shared the content item represented by the Post U21 node. Similarly the CLICKED edge between the User 3 node and the Article 1 node indicates that the user represented by the User 3 node clicked on the article represented by the Article 1 node, and the LIKED edge between the User 3 node and the Comment U1 node indicates that the user represented by the User 3 node liked the content item represented by the Comment U1 node.

In some implementations, combinations of nodes and edges are used to compute various scores, and those scores are used by various components of the generative summarization dialog-based information retrieval system to, for example, generate search prompts or generate response prompts. For example, a score that measures the affinity of the user represented by the User 1 node to the post represented by the Post U21 node can be computed using a path p1 that includes a sequence of edges between the nodes User 1 and Post U21 and/or a path p2 that includes a sequence of edges between the nodes User 1, Comment U1, and Post U21 and/or a path p3 that includes a sequence of edges between the nodes User 1, User 2, and Post U21 and/or a path p4 that includes a sequence of edges between the nodes User 1, User 3, Comment U1, Post U21. Any one or more of the paths p1, p2, p3, p4 and/or other paths through the graph 600 can be used to compute scores that represent affinities, relationships, or statistical correlations between different nodes. For instance, based on relative edge counts, a user-post affinity score computed between User U1 and Post U21, which might be predictive of the user's interest in the topic of the Post U21, might be higher than the user-post affinity score computed between User U4 and Post U21. Similarly, a user-skill affinity score computed between User 3 and Skill U31 might be higher than the user-skill affinity score computed between User 3 and Skill U11.

In FIG. 6, the entity graph includes multiple sub-graphs, such as sub-graph A, sub-graph B, sub-graph C, sub-graph D, and sub-graph E. One or more of the sub-graphs can be used as dialog context data by one or more components of the generative summarization dialog-based information retrieval system. The sub-graphs in FIG. 6 pertain to different entity types, but other sub-graphs can be created based on other criteria. For example, sub-graph A includes digital content items potentially associated with learning or career grown. Sub-graph B includes company entities and links involving the company entities. Sub-graph C includes social posts (e.g., posts, comments) and links involving the social posts. Sub-graph D includes user entities (e.g., users, course instructors, etc.) and links involving the users. Sub-graph E includes skills (e.g., skills that may be associated with users and/or jobs) and links involving the skills.

The sub-graphs can facilitate the efficient determination of relevant dialog context data that can be used for search prompt generation and/or response prompt generation. For instance, if a user inputs a request "how do I get promoted?," the system can search sub-graph D to locate the user's node in the graph and traverse the associated links to determine the user's skills, which can be incorporated into a search prompt, e.g., to expand the search query so that the search system searches for resources related to those skills. Continuing the same example, the system can traverse links from the user's node to entities of sub-graph A to determine whether the user has engaged with any learning resources, and incorporate the user's learning history into the generation of a response prompt. For instance, if the user has previously viewed a learning video, the response prompt can be configured to include an instruction to exclude the already-viewed learning video from the response, or to include a more advanced-level video in the response.

The examples shown in FIG. 6 and the accompanying description, above are provided for illustration purposes. This disclosure is not limited to the described examples.

FIG. 7 is a flow diagram of an example method for generative summarization dialog-based information retrieval using components of a generative summarization dialog-based information retrieval system in accordance with some embodiments of the present disclosure.

The method 700 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by one or more components of generative summarization dialog-based information retrieval system 102 of FIG. 1A or generative summarization dialog-based information retrieval system 580 of FIG. 5. For example, in some implementations, portions of the method 700 are performed by one or more components of a generative summarization dialog-based information retrieval system shown in FIG. 1A and/or FIG. 2B and/or FIG. 5, described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 702, the processing device generates a first search prompt based on a first input portion of an online dialog involving a user of a computing device. In some implementations, the first search prompt includes a dialog summarization instruction. In some implementations, the dialog summarization instruction is configured to instruct a large language model to generate and output a dialog summary. In some implementations, the dialog summary includes a machine-generated summary of a dialog history, attribute data associated with the user, and/or online activity data associated with the user. In some implementations, the dialog history includes at least the first input portion of the online dialog. Operation 702 is performed, for example, by the search prompt generator 104 shown in FIG. 1A and/or the search prompt generator 202 shown in FIG. 2B, described herein.

In some implementations, operation 702 includes extracting a topic from the dialog summary, and including, in the first search prompt, a topic matching instruction configured to instruct the large language model to filter the search result data based on the extracted topic.

In some implementations, operation 702 includes traversing an entity graph to identify attribute data associated with the user, retrieving at least some of the identified attribute data from at least one data store, and including the retrieved attribute data in the first search prompt. In some implementations, the first search prompt includes a query disambiguation instruction configured to instruct the large language model to use the retrieved stored attribute data to disambiguate an ambiguous portion of the dialog history.

In some implementations, operation 702 includes retrieving stored attribute data associated with the user, and including the retrieved attribute data in the first search prompt. In some implementations, the first search prompt includes a query expansion instruction configured to instruct the large language model to use the retrieved attribute data to expand the first search query.

In some implementations, operation 702 includes traversing an entity graph to identify online activity data associated with the user, retrieving at least some of the identified online activity data from at least one data store, and including the retrieved stored online activity data in the first search prompt. In some implementations, the first search prompt includes a query disambiguation instruction configured to instruct the large language model to use the retrieved stored online activity data to disambiguate an ambiguous portion of the dialog history.

In some implementations, operation 702 includes retrieving stored online activity data associated with the user, and including the retrieved stored online activity data in the first search prompt. In some implementations, the first search prompt includes a query expansion instruction configured to instruct the large language model to use the retrieved stored online activity data to expand the first search query.

At operation 704, the processing device sends the first search prompt to a first large language model. Send as used herein may refer to any mechanism by which an AI model, such as the first large language model, can be applied to one or more inputs, such as the first search prompt. For example, send can include the transmission of an electronic communication over a network and/or an application programming interface (API). In some implementations, operation 704 for performed, for example, by the search prompt generator 104 alone or in combination with the first large language model 108 shown in FIG. 1A and/or the search prompt generator 202 alone or in combination with the first generative model 204 shown in FIG. 2B, described herein.

At operation 706, the processing device receives a first search query. For example, in response to the first search prompt, the first search query is generated and output by the first large language model based on the dialog summary. Receive as used herein may refer to any mechanism by which one or more outputs generated by an AI model, such as the first large language model, are obtained from the AI model. For example, receive can include the transmission of an electronic communication over a network and/or an application programming interface (API). In some implementations, operation 706 is performed, for example, by the search system 112 alone or in combination with the first large language model 108 shown in FIG. 1A and/or the search system 208 alone or in combination with the first generative model 204 shown in FIG. 2B, described herein.

At operation 708, the processing device sends the first search query to a search system. In some implementations, operation 706 is performed, for example, by the search system 112 alone or in combination with the first large language model 108 shown in FIG. 1A and/or the search system 208 alone or in combination with the first generative model 204 shown in FIG. 2B, described herein.

At operation 710, the processing device receives search result data. For example, the search result data is determined based on an execution of the first search query by the search system. In some implementations, operation 710 is performed, for example, by the response prompt generator 116 alone or in combination with the search system 112 shown in FIG. 1A and/or the response prompt generator 210 alone or in combination with the search system 208 shown in FIG. 2B, described herein.

At operation 712, the processing device includes at least some of the search result data in a first output portion of the online dialog. For example, the first output portion is configured to be displayed at the computing device in response to the first input portion of the online dialog. In some implementations, operation 712 for is performed, for example, by second large language model 120 shown in FIG. 1A and/or the second generative model 212 shown in FIG. 2B, described herein.

In some implementations, the processing device generates a first response prompt, sends the first response prompt to a second large language model, receives a first response, and includes the first response in the first output portion of the online dialog. For example, the first response prompt is generated based on the first input portion of the online dialog, the summary, and the search result data. In some implementations, the first response is generated and output by the second large language model based on the first response prompt.

In some implementations, the processing device includes, in the first response prompt, a result summarization instruction configured to instruct the large language model to generate and output a result summary of the search result data. In some implementations, the first response is based on the result summary.

In some implementations, the processing device includes, in the first response prompt, a relevance instruction configured to instruct the large language model to determine relevance of the search result data to the first input portion of the online dialog and include relevant search result data in the first response.

Either or both of the search prompt and response prompt can be implemented as multi-step prompts, prompts containing sub-prompts, or as a set of prompts. For example, a response prompt can be implemented as a set of prompts or sub-prompts that includes a relevance prompt, a filter prompt, and a response generation prompt. Similarly, a search prompt can be implemented as a set of prompts or sub-prompts that includes a query interpretation prompt, a disambiguation prompt, a query expansion prompt, and a query generation prompt.

In some implementations, the processing device receives the search result data by traversing an entity graph to determine at least one recommendation that matches the first search query, or traversing an index to identify at least one digital content item that matches the first search query, or receiving, from at least one machine learning model, at least one recommendation that matches the first search query. In some implementations, the at least one recommendation includes an online resource and/or a human resource. In some implementations, the at least one digital content item includes an article, a document, an audio file, and/or a video file.

In some implementations, the processing device causes a generative AI model to machine-generate and include in the search prompt and/or response one or more images, videos and/or audio items that have been machine-generated.

In some implementations, to address the technical problem of reducing the burden of user input during information retrieval, the processing device presents the machine-generated response to a user at an information retrieval interface, and receives user input in response to the machine-generated response, where the user input includes any of: a modification of the machine-generated response, a request for a new machine-generated response, or incorporating at least a portion of the machine-generated response into a new user request and causing the new user request to be submitted to the information retrieval system.

In some implementations, to address the technical problem of scalability, the processing device selects one or more prompt templates for the search prompt and/or response prompt from a library of prompt templates, where the library of prompt templates contains one or more orders of magnitude fewer templates than there are users of the information retrieval system.

In some implementations, to address the technical problem of efficient information retrieval, the processing device configures one or more of the search prompt or the response prompt to include an instruction to a generative AI model (e.g., large language model) to convert one or more prompt inputs from a first size to a second size, or to convert a system-generated output of the large language model from a first size to a second size, where the second size is more efficient for information retrieval than the first size.

In some implementations, the processing device configures one or more of the search prompt or response prompt to cause a generative AI model (e.g., large language model) to generate and transmit output of the generative AI model in dependence on interaction between the user and previously-generated large language model output, where the one or more prompts are configured to trigger the generative AI model to generate content suitable for rendering at end user devices with different screen resolutions so as to facilitate interaction between users and the digital content resulting in improved information retrieval.

In some implementations, to address the technical problem of latency, the processing device detects an increase in latency of the generative AI model outputting a system-generated response, and in response to detecting the increase in latency, performs any one or more of: reducing a number of model inputs such as a size of contextual data or dialog history, or filtering contextual data or dialog history, or using one or more AI models with reduced size; or using a more compact prompt template (e.g., reducing the number of instructions or sections in the prompt template), or reducing a size of the system-generated output (e.g., instructing the generative AI model to limit the maximum size of the output).

The examples shown in FIG. 7 and the accompanying description, above are provided for illustration purposes. This disclosure is not limited to the described examples.

FIG. 8 is a block diagram of an example computer system including components of a generative summarization dialog-based information retrieval system in accordance with some embodiments of the present disclosure.

In FIG. 8, an example machine of a computer system 800 is shown, within which a set of instructions for causing the machine to perform any of the methodologies discussed herein can be executed. In some embodiments, the computer system 800 can correspond to a component of a networked computer system (e.g., as a component of the computing system 100 of FIG. 1A or the computer system 500 of FIG. 5) that includes, is coupled to, or utilizes a machine to execute an operating system to perform operations corresponding to one or more components of the generative summarization dialog-based information retrieval system 102 of FIG. 1A or the generative summarization dialog-based information retrieval system 580 of FIG. 5. For example, computer system 800 corresponds to a portion of computing system 500 when the computing system is executing a portion of generative summarization dialog-based information retrieval system 102 or generative summarization dialog-based information retrieval system 580.

The machine is connected (e.g., networked) to other machines in a network, such as a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a memory 803 (e.g., flash memory, static random access memory (SRAM), etc.), an input/output system 810, and a data storage system 840, which communicate with each other via a bus 830.

Processing device 802 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be at least one special-purpose processing device such as an application specific integrated circuit (ASIC), a field programmable gate array (FPGA), a digital signal processor (DSP), network processor, or the like. The processing device 802 is configured to execute instructions 812 for performing the operations and steps discussed herein.

In some embodiments of FIG. 8, generative summarization dialog-based information retrieval system 850 represents portions of generative summarization dialog-based information retrieval system 580 when the computer system 800 is executing those portions of generative summarization dialog-based information retrieval system 580. Instructions 812 include portions of generative summarization dialog-based information retrieval system 850 when those portions of the generative summarization dialog-based information retrieval system 850 are being executed by processing device 802. Thus, the generative summarization dialog-based information retrieval system 850 is shown in dashed lines as part of instructions 812 to illustrate that, at times, portions of the generative summarization dialog-based information retrieval system 850 are executed by processing device 802. For example, when at least some portion of the generative summarization dialog-based information retrieval system 850 is embodied in instructions to cause processing device 802 to perform the method(s) described herein, some of those instructions can be read into processing device 802 (e.g., into an internal cache or other memory) from main memory 804 and/or data storage system 840. However, it is not required that all of the generative summarization dialog-based information retrieval system 850 be included in instructions 812 at the same time and portions of the generative summarization dialog-based information retrieval system 850 are stored in at least one other component of computer system 800 at other times, e.g., when at least one portion of the generative summarization dialog-based information retrieval system 850 are not being executed by processing device 802.

The computer system 800 further includes a network interface device 808 to communicate over the network 820. Network interface device 808 provides a two-way data communication coupling to a network. For example, network interface device 808 can be an integrated-services digital network (ISDN) card, cable modem, satellite modem, or a modem to provide a data communication connection to a corresponding type of telephone line. As another example, network interface device 808 can be a local area network (LAN) card to provide a data communication connection to a compatible LAN. Wireless links can also be implemented. In any such implementation network interface device 808 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 800.

Computer system 800 can send messages and receive data, including program code, through the network(s) and network interface device 808. In the Internet example, a server can transmit a requested code for an application program through the Internet and network interface device 808. The received code can be executed by processing device 802 as it is received, and/or stored in data storage system 840, or other non-volatile storage for later execution.

The input/output system 810 includes an output device, such as a display, for example a liquid crystal display (LCD) or a touchscreen display, for displaying information to a computer user, or a speaker, a haptic device, or another form of output device. The input/output system 810 can include an input device, for example, alphanumeric keys and other keys configured for communicating information and command selections to processing device 802. An input device can, alternatively or in addition, include a cursor control, such as a mouse, a trackball, or cursor direction keys for communicating direction information and command selections to processing device 802 and for controlling cursor movement on a display. An input device can, alternatively or in addition, include a microphone, a sensor, or an array of sensors, for communicating sensed information to processing device 802. Sensed information can include voice commands, audio signals, geographic location information, haptic information, and/or digital imagery, for example.

The data storage system 840 includes a machine-readable storage medium 842 (also known as a computer-readable medium) on which is stored at least one set of instructions 844 or software embodying any of the methodologies or functions described herein. The instructions 844 can also reside, completely or at least partially, within the main memory 804 and/or within the processing device 802 during execution thereof by the computer system 800, the main memory 804 and the processing device 802 also constituting machine-readable storage media. In one embodiment, the instructions 844 include instructions to implement functionality corresponding to a generative summarization dialog-based information retrieval system 850 (e.g., the generative summarization dialog-based information retrieval system 102 of FIG. 1A or generative summarization dialog-based information retrieval system 580 of FIG. 5).

Dashed lines are used in FIG. 8 to indicate that it is not required that the generative summarization dialog-based information retrieval system be embodied entirely in instructions 812, 814, and 844 at the same time. In one example, portions of the generative summarization dialog-based information retrieval system are embodied in instructions 814, which are read into main memory 804 as instructions 814, and portions of instructions 812 are read into processing device 802 as instructions 812 for execution. In another example, some portions of the generative summarization dialog-based information retrieval system are embodied in instructions 844 while other portions are embodied in instructions 814 and still other portions are embodied in instructions 812.

While the machine-readable storage medium 842 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 8 and the accompanying description, above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100 or the computing system 500, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples described herein, or any combination of any of the examples described herein, or any combination of any portions of the examples described herein.

In an example 1, a method includes: generating a first search prompt based on a first input portion of an online dialog involving a user of a computing device, where the first search prompt includes a dialog summarization instruction to generate and output a dialog summary, and the dialog summary includes a machine-generated summary based on at least one of a dialog history, attribute data associated with the user, or online activity data associated with the user; sending the first search prompt to a first large language model; receiving a first search query, where, in response to the first search prompt, the first search query is generated and output by the first large language model based on the dialog summary; sending the first search query to a search system; receiving search result data, where the search result data is determined based on an execution of the first search query by the search system; and including at least some of the search result data in a first output portion of the online dialog, where the first output portion is configured to be displayed at the computing device in response to the first input portion of the online dialog.

An example 2 includes the subject matter of example 1, where generating the first search prompt further includes: extracting a topic from the dialog summary; and including, in the first search prompt, a topic matching instruction configured to instruct the first large language model to filter the search result data based on the extracted topic. An example 3 includes the subject matter of example 1 or example 2, where generating the first search prompt further includes: traversing an entity graph to identify attribute data associated with the user; retrieving at least some of the identified attribute data from at least one data store; and including the retrieved attribute data in the first search prompt, where the first search prompt further includes a query disambiguation instruction configured to instruct the first large language model to use the retrieved attribute data to disambiguate an ambiguous portion of the dialog history. An example 4 includes the subject matter of any of examples 1-3, where generating the first search prompt further includes: retrieving stored attribute data associated with the user; and including the retrieved attribute data in the first search prompt, where the first search prompt further includes a query expansion instruction configured to instruct the first large language model to use the retrieved attribute data to expand the first search query. An example 5 includes the subject matter of any of examples 1-4, where generating the first search prompt further includes: traversing an entity graph to identify online activity data associated with the user; retrieving at least some of the identified online activity data from at least one data store; and including the retrieved online activity data in the first search prompt, where the first search prompt further includes a query disambiguation instruction configured to instruct the first large language model to use the retrieved online activity data to disambiguate an ambiguous portion of the dialog history. An example 6 includes the subject matter of any of examples 1-5, where generating the first search prompt further includes: retrieving stored online activity data associated with the user; and including the retrieved online activity data in the first search prompt, where the first search prompt further includes a query expansion instruction configured to instruct the first large language model to use the retrieved online activity data to expand the first search query. An example 7 includes the subject matter of any of examples 1-6, further including: generating a first response prompt based on the first input portion of the online dialog, the dialog summary, and the search result data; sending the first response prompt to a second large language model; receiving a first response, where the first response is generated and output by the second large language model based on the first response prompt; and including the first response in the first output portion of the online dialog. An example 8 includes the subject matter of example 1-7, where generating the first response prompt further includes: including, in the first response prompt, a result summarization instruction configured to instruct the second large language model to generate and output a result summary of the search result data, where the first response is based on the result summary. An example 9 includes the subject matter of example 7, where generating the first response prompt further includes: including, in the first response prompt, a relevance instruction configured to instruct the second large language model to determine relevance of the search result data to the first input portion of the online dialog and include relevant search result data in the first response. An example 10 includes the subject matter of any of examples 1-8, where receiving the search result data includes at least one of: traversing an entity graph to determine at least one recommendation that matches the first search query, where the at least one recommendation includes at least one of an online resource or a human resource; or traversing an index to identify at least one digital content item that matches the first search query, where the at least one digital content item includes at least one of an article, a document, an audio file, or a video file; or receiving, from at least one machine learning model, at least one recommendation that matches the first search query.

In an example 11, a system includes: at least one processor; and at least one memory device coupled to the at least one processor, where the at least one memory device includes at least one instruction that, when executed by the at least one processor, cause the at least one processor to perform at least one operation including: generating a first search prompt based on a first input portion of an online dialog involving a user of a computing device, where the first search prompt includes a dialog summarization instruction to generate and output a dialog summary, and the dialog summary includes a machine-generated summary based on at least one of a dialog history, attribute data associated with the user, or online activity data associated with the user; sending the first search prompt to a first large language model; receiving a first search query, where, in response to the first search prompt, the first search query is generated and output by the first large language model based on the dialog summary; sending the first search query to a search system; receiving search result data, where the search result data is determined based on an execution of the first search query by the search system; and including at least some of the search result data in a first output portion of the online dialog, where the first output portion is configured to be displayed at the computing device in response to the first input portion of the online dialog.

An example 12 includes the subject matter of example 11, where generating the first search prompt further includes at least one of: (a) (i) extracting a topic from the dialog summary; and (ii) including, in the first search prompt, a topic matching instruction configured to instruct the first large language model to filter the search result data based on the extracted topic; or (b) (i) traversing an entity graph to identify attribute data associated with the user; (ii) retrieving at least some of the identified attribute data from at least one data store; and (iii) including the retrieved attribute data in the first search prompt, where the first search prompt further includes a query disambiguation instruction configured to instruct the first large language model to use the retrieved attribute data to disambiguate an ambiguous portion of the dialog history; or (c) (i) retrieving stored attribute data associated with the user; and (ii) including the retrieved attribute data in the first search prompt, where the first search prompt further includes a query expansion instruction configured to instruct the first large language model to use the retrieved attribute data to expand the first search query; or (d) (i) traversing an entity graph to identify online activity data associated with the user; (ii) retrieving at least some of the identified online activity data from at least one data store; and (iii) including the retrieved online activity data in the first search prompt, where the first search prompt further includes a query disambiguation instruction configured to instruct the first large language model to use the retrieved online activity data to disambiguate an ambiguous portion of the dialog history; or (e) (i) retrieving stored online activity data associated with the user; and (ii) including the retrieved online activity data in the first search prompt, where the first search prompt further includes a query expansion instruction configured to instruct the first large language model to use the retrieved online activity data to expand the first search query. An example 13 includes the subject matter of example 11 or example 12, where the instructions, when executed by the at least one processor, cause the at least one processor to perform at least one operation further including: generating a first response prompt based on the first input portion of the online dialog, the dialog summary, and the search result data; sending the first response prompt to a second large language model; receiving a first response, where the first response is generated and output by the second large language model based on the first response prompt; and including the first response in the first output portion of the online dialog. An example 14 includes the subject matter of any of examples 11-13, where generating the first response prompt further includes at least one of: including, in the first response prompt, a result summarization instruction configured to instruct the second large language model to generate and output a result summary of the search result data, where the first response is based on the result summary; or including, in the first response prompt, a relevance instruction configured to instruct the second large language model to determine relevance of the search result data to the first input portion of the online dialog and include relevant search result data in the first response. An example 15 includes the subject matter of any of examples 11-14, where receiving the search result data includes at least one of: traversing an entity graph to determine at least one recommendation that matches the first search query, where the at least one recommendation includes at least one of an online resource or a human resource; or traversing an index to identify at least one digital content item that matches the first search query, where the at least one digital content item includes at least one of an article, a document, an audio file, or a video file; or receiving, from at least one machine learning model, at least one recommendation that matches the first search query.

In an example 16, at least one non-transitory machine readable storage medium includes at least one instruction that, when executed by at least one processor, cause the at least one processor to perform at least one operation including: generating a first search prompt based on a first input portion of an online dialog involving a user of a computing device, where the first search prompt includes a dialog summarization instruction to generate and output a dialog summary, and the dialog summary includes a machine-generated summary based on at least one of a dialog history, attribute data associated with the user, or online activity data associated with the user; sending the first search prompt to a first large language model; receiving a first search query, where, in response to the first search prompt, the first search query is generated and output by the first large language model based on the dialog summary; sending the first search query to a search system; receiving search result data, where the search result data is determined based on an execution of the first search query by the search system; and including at least some of the search result data in a first output portion of the online dialog, where the first output portion is configured to be displayed at the computing device in response to the first input portion of the online dialog.

An example 17 includes the subject matter of example 16, where generating the first search prompt further includes at least one of: (a) (i) extracting a topic from the dialog summary; and (ii) including, in the first search prompt, a topic matching instruction configured to instruct the first large language model to filter the search result data based on the extracted topic; or (b) (i) traversing an entity graph to identify attribute data associated with the user; (ii) retrieving at least some of the identified attribute data from at least one data store; and (iii) including the retrieved attribute data in the first search prompt, where the first search prompt further includes a query disambiguation instruction configured to instruct the first large language model to use the retrieved attribute data to disambiguate an ambiguous portion of the dialog history; or (c) (i) retrieving stored attribute data associated with the user; and (ii) including the retrieved attribute data in the first search prompt, where the first search prompt further includes a query expansion instruction configured to instruct the first large language model to use the retrieved attribute data to expand the first search query; or (d) (i) traversing an entity graph to identify online activity data associated with the user; (ii) retrieving at least some of the identified online activity data from at least one data store; and (iii) including the retrieved online activity data in the first search prompt, where the first search prompt further includes a query disambiguation instruction configured to instruct the first large language model to use the retrieved online activity data to disambiguate an ambiguous portion of the dialog history; or (e) (i) retrieving stored online activity data associated with the user; and (ii) including the retrieved online activity data in the first search prompt, where the first search prompt further includes a query expansion instruction configured to instruct the first large language model to use the retrieved online activity data to expand the first search query. An example 18 includes the subject matter of example 16 or example 17, where the instructions, when executed by the at least one processor, cause the at least one processor to perform at least one operation further including: generating a first response prompt based on the first input portion of the online dialog, the dialog summary, and the search result data; sending the first response prompt to a second large language model; receiving a first response, where the first response is generated and output by the second large language model based on the first response prompt; and including the first response in the first output portion of the online dialog. An example 19 includes the subject matter of any of examples 16-18, where generating the first response prompt further includes at least one of: including, in the first response prompt, a result summarization instruction configured to instruct the second large language model to generate and output a result summary of the search result data, where the first response is based on the result summary; or including, in the first response prompt, a relevance instruction configured to instruct the second large language model to determine relevance of the search result data to the first input portion of the online dialog and include relevant search result data in the first response. An example 20 includes the subject matter of any of examples 16-19, where receiving the search result data includes at least one of: traversing an entity graph to determine at least one recommendation that matches the first search query, where the at least one recommendation includes at least one of an online resource or a human resource; or traversing an index to identify at least one digital content item that matches the first search query, where the at least one digital content item includes at least one of an article, a document, an audio file, or a video file; or receiving, from at least one machine learning model, at least one recommendation that matches the first search query.

An example 21 includes the subject matter of any of the other examples, where the processing device causes a generative AI model to machine-generate and include in the search prompt and/or response one or more images, videos and/or audio items that have been machine-generated.

An example 22 includes the subject matter of any of the other examples, where the processing device presents the machine-generated response to a user at an information retrieval interface, and receives user input in response to the machine-generated response, where the user input includes any of: a modification of the machine-generated response, a request for a new machine-generated response, or incorporating at least a portion of the machine-generated response into a new user request and causing the new user request to be submitted to the information retrieval system.

An example 23 includes the subject matter of any of the other examples, where the processing device selects one or more prompt templates for the search prompt and/or response prompt from a library of prompt templates, where the library of prompt templates contains one or more orders of magnitude fewer templates than there are users of the information retrieval system.

An example 24 includes the subject matter of any of the other examples, where the processing device configures one or more of the search prompt or the response prompt to include an instruction to a generative AI model (e.g., large language model) to convert one or more prompt inputs from a first size to a second size, or to convert a system-generated output of the large language model from a first size to a second size, where the second size is more efficient for information retrieval than the first size.

An example 25 includes the subject matter of any of the other examples, where the processing device configures one or more of the search prompt or response prompt to cause a generative AI model (e.g., large language model) to generate and transmit output of the generative AI model in dependence on interaction between the user and previously-generated large language model output, where the one or more prompts are configured to trigger the generative AI model to generate content suitable for rendering at end user devices with different screen resolutions so as to facilitate interaction between users and the digital content resulting in improved information retrieval.

An example 26 includes the subject matter of any of the other examples, where the processing device detects an increase in latency of the generative AI model outputting a system-generated response, and in response to detecting the increase in latency, performs any one or more of: reducing a number of model inputs such as a size of contextual data or dialog history, or filtering contextual data or dialog history, or using one or more AI models with reduced size; or using a more compact prompt template (e.g., reducing the number of instructions or sections in the prompt template), or reducing a size of the system-generated output (e.g., instructing the generative AI model to limit the maximum size of the output).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    generating a first search prompt based on a first input portion of an online dialog involving a user of a computing device, wherein the first search prompt comprises a dialog summarization instruction to generate and output a dialog summary, and the dialog summary comprises a machine-generated summary based on at least one of a dialog history, attribute data associated with the user, or online activity data associated with the user;
    sending the first search prompt to a first large language model;
    receiving a first search query, wherein, in response to the first search prompt, the first search query is generated and output by the first large language model based on the dialog summary;
    sending the first search query to a search system;
    receiving search result data, wherein the search result data is determined based on an execution of the first search query by the search system;
    including at least some of the search result data in a first output portion of the online dialog, wherein the first output portion is configured to be displayed at the computing device in response to the first input portion of the online dialog;
    generating a first response prompt based on the first input portion of the online dialog, the dialog summary, and the search result data;
    sending the first response prompt to a second large language model;
    receiving a first response, wherein the first response is generated and output by the second large language model based on the first response prompt; and
    including the first response in the first output portion of the online dialog.

2. The method of claim 1, wherein generating the first search prompt further comprises:
    extracting a topic from the dialog summary; and
    including, in the first search prompt, a topic matching instruction configured to instruct the first large language model to filter the search result data based on the extracted topic.

3. The method of claim 1, wherein generating the first search prompt further comprises:
    traversing an entity graph to identify attribute data associated with the user;
    retrieving at least some of the identified attribute data from at least one data store; and including the retrieved attribute data in the first search prompt, wherein the first search prompt further comprises a query disambiguation instruction configured to instruct the first large language model to use the retrieved attribute data to disambiguate an ambiguous portion of the dialog history.

4. The method of claim 1, wherein generating the first search prompt further comprises:
   retrieving stored attribute data associated with the user; and
   including the retrieved attribute data in the first search prompt, wherein the first search prompt further comprises a query expansion instruction configured to instruct the first large language model to use the retrieved attribute data to expand the first search query.

5. The method of claim 1, wherein generating the first search prompt further comprises:
   traversing an entity graph to identify online activity data associated with the user;
   retrieving at least some of the identified online activity data from at least one data store; and
   including the retrieved online activity data in the first search prompt, wherein the first search prompt further comprises a query disambiguation instruction configured to instruct the first large language model to use the retrieved online activity data to disambiguate an ambiguous portion of the dialog history.

6. The method of claim 1, wherein generating the first search prompt further comprises:
   retrieving stored online activity data associated with the user; and
   including the retrieved online activity data in the first search prompt, wherein the first search prompt further comprises a query expansion instruction configured to instruct the first large language model to use the retrieved online activity data to expand the first search query.

7. The method of claim 1, wherein generating the first response prompt further comprises:
   including, in the first response prompt, a result summarization instruction configured to instruct the second large language model to generate and output a result summary of the search result data, wherein the first response is based on the result summary.

8. The method of claim 1, wherein generating the first response prompt further comprises:
   including, in the first response prompt, a relevance instruction configured to instruct the second large language model to determine relevance of the search result data to the first input portion of the online dialog and include relevant search result data in the first response.

9. The method of claim 1, wherein receiving the search result data comprises at least one of:
   traversing an entity graph to determine at least one recommendation that matches the first search query, wherein the at least one recommendation comprises at least one of an online resource or a human resource; or
   traversing an index to identify at least one digital content item that matches the first search query, wherein the at least one digital content item comprises at least one of an article, a document, an audio file, or a video file; or
   receiving, from at least one machine learning model, at least one recommendation that matches the first search query.

10. A system comprising:
    at least one processor; and
    at least one memory device coupled to the at least one processor, wherein the at least one memory device comprises at least one instruction that, when executed by the at least one processor, cause the at least one processor to perform at least one operation comprising:
    generating a first search prompt based on a first input portion of an online dialog involving a user of a computing device, wherein the first search prompt comprises a dialog summarization instruction to generate and output a dialog summary, and the dialog summary comprises a machine-generated summary based on at least one of a dialog history, attribute data associated with the user, or online activity data associated with the user;
    sending the first search prompt to a first large language model;
    receiving a first search query, wherein, in response to the first search prompt, the first search query is generated and output by the first large language model based on the dialog summary;
    sending the first search query to a search system;
    receiving search result data, wherein the search result data is determined based on an execution of the first search query by the search system;
    including at least some of the search result data in a first output portion of the online dialog, wherein the first output portion is configured to be displayed at the computing device in response to the first input portion of the online dialog;
    generating a first response prompt based on the first input portion of the online dialog, the dialog summary, and the search result data;
    sending the first response prompt to a second large language model;
    receiving a first response, wherein the first response is generated and output by the second large language model based on the first response prompt; and
    including the first response in the first output portion of the online dialog.

11. The system of claim 10, wherein generating the first search prompt further comprises at least one of:
    (a) (i) extracting a topic from the dialog summary; and
    (ii) including, in the first search prompt, a topic matching instruction configured to instruct the first large language model to filter the search result data based on the extracted topic; or
    (b) (i) traversing an entity graph to identify attribute data associated with the user;
    (ii) retrieving at least some of the identified attribute data from at least one data store; and
    (iii) including the retrieved attribute data in the first search prompt, wherein the first search prompt further comprises a query disambiguation instruction configured to instruct the first large language model to use the retrieved attribute data to disambiguate an ambiguous portion of the dialog history; or
    (c) (i) retrieving stored attribute data associated with the user; and
    (ii) including the retrieved attribute data in the first search prompt, wherein the first search prompt further comprises a query expansion instruction configured to instruct the first large language model to use the retrieved attribute data to expand the first search query; or (d) (i) traversing an entity graph to identify online activity data associated with the user;
(ii) retrieving at least some of the identified online activity data from at least one data store; and
(iii) including the retrieved online activity data in the first search prompt, wherein the first search prompt further comprises a query disambiguation instruction configured to instruct the first large language model to use the retrieved online activity data to disambiguate an ambiguous portion of the dialog history; or
(e) (i) retrieving stored online activity data associated with the user; and
(ii) including the retrieved online activity data in the first search prompt, wherein the first search prompt further comprises a query expansion instruction configured to instruct the first large language model to use the retrieved online activity data to expand the first search query.

12. The system of claim 10, wherein the instructions, when executed by the at least one processor, cause the at least one processor to perform at least one operation further comprising:
generating a first response prompt based on the first input portion of the online dialog, the dialog summary, and the search result data;
sending the first response prompt to a second large language model;
receiving a first response, wherein the first response is generated and output by the second large language model based on the first response prompt; and
including the first response in the first output portion of the online dialog.

13. The system of claim 12, wherein generating the first response prompt further comprises at least one of:
including, in the first response prompt, a result summarization instruction configured to instruct the second large language model to generate and output a result summary of the search result data, wherein the first response is based on the result summary; or
including, in the first response prompt, a relevance instruction configured to instruct the second large language model to determine relevance of the search result data to the first input portion of the online dialog and include relevant search result data in the first response.

14. The system of claim 10, wherein receiving the search result data comprises at least one of:
traversing an entity graph to determine at least one recommendation that matches the first search query, wherein the at least one recommendation comprises at least one of an online resource or a human resource; or
traversing an index to identify at least one digital content item that matches the first search query, wherein the at least one digital content item comprises at least one of an article, a document, an audio file, or a video file; or
receiving, from at least one machine learning model, at least one recommendation that matches the first search query.

15. At least one non-transitory machine readable storage medium comprising at least one instruction that, when executed by at least one processor, causes the at least one processor to perform at least one operation comprising:
generating a first search prompt based on a first input portion of an online dialog involving a user of a computing device, wherein the first search prompt comprises a dialog summarization instruction to generate and output a dialog summary, and the dialog summary comprises a machine-generated summary based on at least one of a dialog history, attribute data associated with the user, or online activity data associated with the user;
sending the first search prompt to a first large language model;
receiving a first search query, wherein, in response to the first search prompt, the first search query is generated and output by the first large language model based on the dialog summary;
sending the first search query to a search system;
receiving search result data, wherein the search result data is determined based on an execution of the first search query by the search system;
including at least some of the search result data in a first output portion of the online dialog, wherein the first output portion is configured to be displayed at the computing device in response to the first input portion of the online dialog;
generating a first response prompt based on the first input portion of the online dialog, the dialog summary, and the search result data;
sending the first response prompt to a second large language model;
receiving a first response, wherein the first response is generated and output by the second large language model based on the first response prompt; and
including the first response in the first output portion of the online dialog.

16. The at least one non-transitory machine readable storage medium of claim 15, wherein generating the first search prompt further comprises at least one of:
(a) (i) extracting a topic from the dialog summary; and
(ii) including, in the first search prompt, a topic matching instruction configured to instruct the first large language model to filter the search result data based on the extracted topic; or
(b) (i) traversing an entity graph to identify attribute data associated with the user;
(ii) retrieving at least some of the identified attribute data from at least one data store; and
(iii) including the retrieved attribute data in the first search prompt, wherein the first search prompt further comprises a query disambiguation instruction configured to instruct the first large language model to use the retrieved attribute data to disambiguate an ambiguous portion of the dialog history; or
(c) (i) retrieving stored attribute data associated with the user; and
(ii) including the retrieved attribute data in the first search prompt, wherein the first search prompt further comprises a query expansion instruction configured to instruct the first large language model to use the retrieved attribute data to expand the first search query; or
(d) (i) traversing an entity graph to identify online activity data associated with the user;
(ii) retrieving at least some of the identified online activity data from at least one data store; and
(iii) including the retrieved online activity data in the first search prompt, wherein the first search prompt further comprises a query disambiguation instruction configured to instruct the first large language model to use the retrieved online activity data to disambiguate an ambiguous portion of the dialog history; or
(e) (i) retrieving stored online activity data associated with the user; and (ii) including the retrieved online activity data in the first search prompt, wherein the first search prompt further comprises a query expansion instruction configured to instruct the first large language model to use the retrieved online activity data to expand the first search query.

17. The at least one non-transitory machine readable storage medium of claim 15, wherein the instructions, when executed by the at least one processor, cause the at least one processor to perform at least one operation further comprising:

generating a first response prompt based on the first input portion of the online dialog, the dialog summary, and the search result data;
sending the first response prompt to a second large language model;
receiving a first response, wherein the first response is generated and output by the second large language model based on the first response prompt; and
including the first response in the first output portion of the online dialog.

18. The at least one non-transitory machine readable storage medium of claim 17, wherein generating the first response prompt further comprises at least one of:

including, in the first response prompt, a result summarization instruction configured to instruct the second large language model to generate and output a result summary of the search result data, wherein the first response is based on the result summary; or
including, in the first response prompt, a relevance instruction configured to instruct the second large language model to determine relevance of the search result data to the first input portion of the online dialog and include relevant search result data in the first response.

19. The at least one non-transitory machine readable storage medium of claim 15, wherein receiving the search result data comprises at least one of:

traversing an entity graph to determine at least one recommendation that matches the first search query, wherein the at least one recommendation comprises at least one of an online resource or a human resource; or
traversing an index to identify at least one digital content item that matches the first search query, wherein the at least one digital content item comprises at least one of an article, a document, an audio file, or a video file; or
receiving, from at least one machine learning model, at least one recommendation that matches the first search query.

\* \* \* \* \*